US009338313B2

(12) United States Patent
Noguchi et al.

(10) Patent No.: US 9,338,313 B2
(45) Date of Patent: May 10, 2016

(54) DOCUMENT MANAGEMENT APPARATUS AND DOCUMENT MANAGEMENT SYSTEM

(75) Inventors: Daisuke Noguchi, Kanagawa (JP); Miki Oouchi, Kanagawa (JP); Masafumi Nagao, Kanagawa (JP); Osamu Torii, Kanagawa (JP); Reiji Yukumoto, Kanagawa (JP); Tetsuo Asakawa, Tokyo (JP)

(73) Assignee: RICOH COMPANY, LIMITED, Tokyo (JP)

( * ) Notice: Subject to any disclaimer, the term of this patent is extended or adjusted under 35 U.S.C. 154(b) by 846 days.

(21) Appl. No.: 13/396,060

(22) Filed: Feb. 14, 2012

(65) Prior Publication Data
US 2012/0215883 A1 Aug. 23, 2012

(30) Foreign Application Priority Data

Feb. 18, 2011 (JP) .................................. 2011-033608
Nov. 18, 2011 (JP) .................................. 2011-253198

(51) Int. Cl.
*H04N 1/00* (2006.01)
*H04N 1/32* (2006.01)

(52) U.S. Cl.
CPC ....... *H04N 1/00347* (2013.01); *H04N 1/32112* (2013.01); *H04N 2201/0087* (2013.01);
(Continued)

(58) Field of Classification Search
CPC . G06F 17/30864; G06F 21/6263; G06F 8/60; G06F 17/30274; G06F 17/30902; G06F 21/316; G06F 21/552; G06F 17/30867; G06F 21/55; H04N 1/00347; H04N 1/32112
USPC .................................. 715/234, 243, 254, 255
See application file for complete search history.

(56) References Cited

U.S. PATENT DOCUMENTS 7,688,461 B2 3/2010 Wise
2005/0216581 A1* 9/2005 Blumenau et al. ............ 709/223
(Continued)

FOREIGN PATENT DOCUMENTS

CN 1622028 A 6/2005
CN 1763737 A 4/2006
(Continued)

OTHER PUBLICATIONS

Pei, Li Dang, "Method and device for obtaining media object support module," English translation of CN 1852306, published Oct. 25, 2006.*

(Continued)

*Primary Examiner* — Kyle Stork
(74) *Attorney, Agent, or Firm* — Oblon, McClelland, Maier & Neustadt, L.L.P

(57) ABSTRACT

A document management apparatus delivers a to-be-delivered document to a delivery destination and collects information about browsing history of the document. The document management apparatus includes: a delivery-pattern determining unit; a delivery-information generating unit; a document delivery unit that delivers the document by transmitting the information of the delivery pattern to a network address of the delivery destination; and a browsing-history management unit that acquires information about browsing history. The delivery-pattern determining unit, when the type of the device is a type not adapted to a function of collecting information about browsing history, determines that a pattern for delivering a program for implementing collection of the information about browsing history together with the document as the delivery pattern. Otherwise, the delivery-information generating unit generates associating information that associates the document with the program such that the program is to be executed when the document is browsed.

12 Claims, 20 Drawing Sheets

(52) U.S. Cl.
CPC *H04N2201/0089* (2013.01); *H04N 2201/3202* (2013.01); *H04N 2201/3204* (2013.01); *H04N 2201/3225* (2013.01); *H04N 2201/3226* (2013.01); *H04N 2201/3274* (2013.01); *H04N 2201/3278* (2013.01)

(56) References Cited

U.S. PATENT DOCUMENTS

| | | |
|---|---|---|
| 2006/0077421 A1 | 4/2006 | Eden et al. |
| 2006/0200441 A1 | 9/2006 | Nagatsuka |
| 2006/0282684 A1 | 12/2006 | Kakoi et al. |
| 2007/0124459 A1* | 5/2007 | Kasama ............... 709/224 |
| 2009/0190147 A1 | 7/2009 | Uruta et al. |
| 2009/0225356 A1 | 9/2009 | Satoh et al. |
| 2010/0100778 A1* | 4/2010 | Sullivan ............... 714/57 |
| 2010/0134820 A1 | 6/2010 | Nakamura et al. |
| 2011/0007365 A1 | 1/2011 | Yukumoto et al. |
| 2011/0019229 A1 | 1/2011 | Hayashi et al. |
| 2011/0063688 A1 | 3/2011 | Hayashi et al. |
| 2011/0102833 A1 | 5/2011 | Torii et al. |
| 2011/0153806 A1* | 6/2011 | Bagasra ............... 709/224 |
| 2011/0310409 A1 | 12/2011 | Yukumoto et al. |
| 2012/0054841 A1* | 3/2012 | Schultz et al. ............... 726/6 |

FOREIGN PATENT DOCUMENTS

| | | |
|---|---|---|
| CN | 1852306 A | 10/2006 |
| JP | 2000-341659 | 12/2000 |
| JP | 2003-85204 | 3/2003 |
| JP | 2003-150760 | 5/2003 |
| JP | 2004-199667 | 7/2004 |
| JP | 2005-92709 | 4/2005 |
| JP | 2008-27013 | 2/2008 |
| JP | 2009-128936 | 6/2009 |
| JP | 2009-211406 | 9/2009 |

OTHER PUBLICATIONS

Combined Chinese Office Action and Search Report issued Feb. 7, 2014 in Patent Application No. 2012100359195 (with English language translation).

Chinese Office Action issued Aug. 28, 2014, in China Patent Application No. 201210035919.5 (with English translation).

* cited by examiner

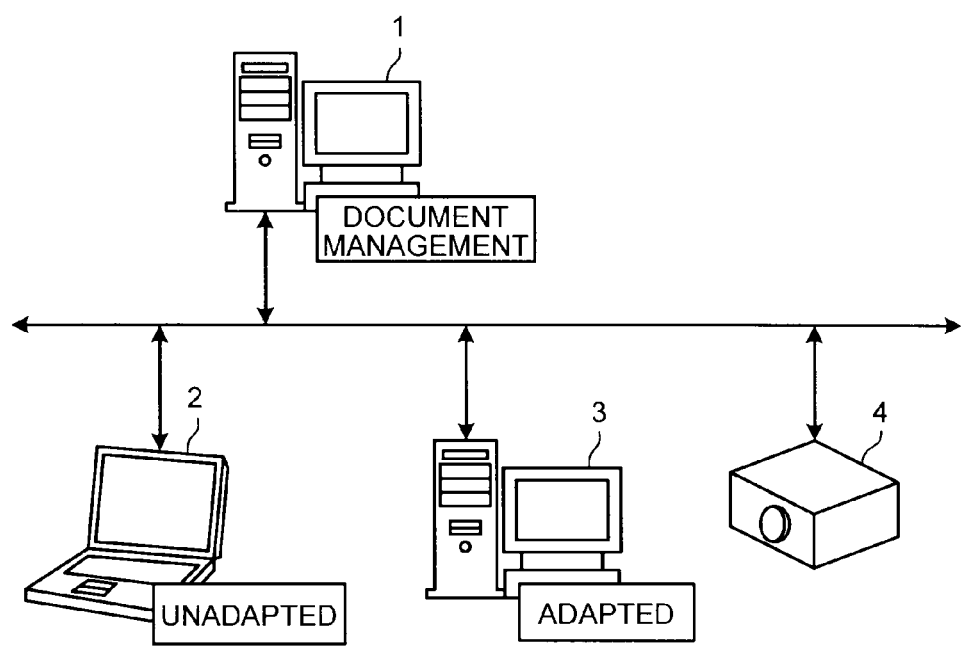
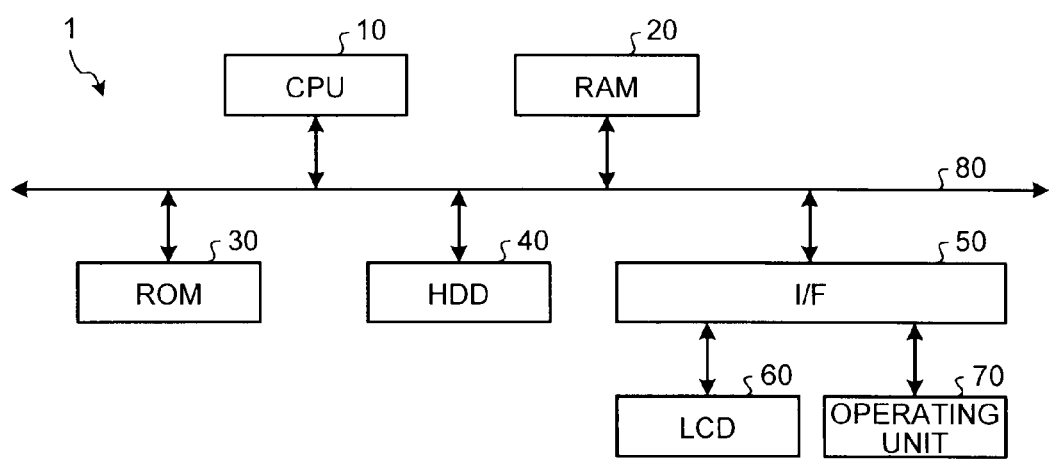

FIG.4

| DOCUMENT NAME | ID | DELIVERY DESTINATION ADDRESS | DEVICE TYPE | DELIVERY PATTERN | DELIVERY STATUS | |
|---|---|---|---|---|---|---|
| MATERIAL FOR XX | 001 | xxx.xxx.xxx.xxx | ADAPTED | DOCUMENT | DELIVERED | ... |
| | | xxx.xxx.xxx.xxx | UNADAPTED | DOCUMENT & APPLICATION | DELIVERED | |
| | | xxx.xxx.xxx.xxx | DISPLAY-ONLY | DISPLAY INFORMATION | DELIVERED | |
| | | ... | ... | ... | ... | |
| ... | | | | | | |

FIG.5

| DOCUMENT ID | DELIVERY DESTINATION ADDRESS | HISTORY COLLECTION STATUS | HISTORY ID | |
|---|---|---|---|---|
| 001 | xxx.xxx.xxx.xxx | HISTORY COLLECTED | X001 | ... |
| | xxx.xxx.xxx.xxx | HISTORY COLLECTED | X002 | |
| | xxx.xxx.xxx.xxx | HISTORY UNCOLLECTED | X003 | |
| | ... | ... | ... | |
| ... | | | | |

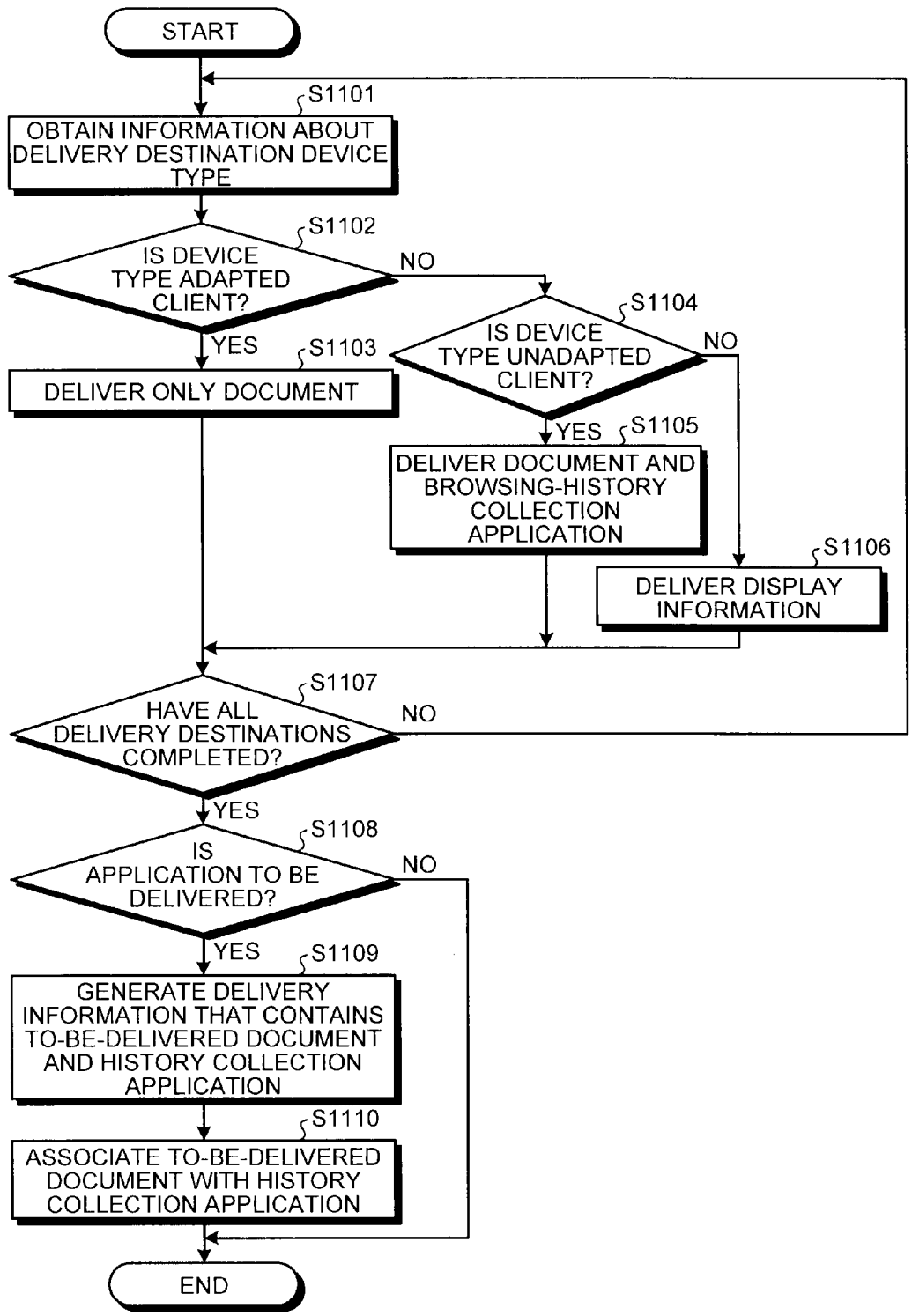

| DOCUMENT NAME | PRESENTATION MATERIAL FOR XX |
|---|---|
| DOCUMENT ID | 001 |
| NAME OF EXECUTABLE FILE | RIREKI.EXE |

FIG.14A

| DOCU-MENT NAME | ID | DELIVERY DESTINATION ADDRESS | DEVICE TYPE | VERSION CHECK | VERSION | DELIVERY PATTERN | DELIV-ERY STATUS | |
|---|---|---|---|---|---|---|---|---|
| MATERIAL FOR XX | 001 | xxx.xxx.xxx.xxx | ADAPTED | | | | DELIV-ERED | ... |
| | | xxx.xxx.xxx.xxx | UN-ADAPTED | | | DOCUMENT & APPLICATION | DELIV-ERED | |
| ... | | | | | | | | |

FIG.14B

| DOCU-MENT NAME | ID | DELIVERY DESTINATION ADDRESS | DEVICE TYPE | VERSION CHECK | VERSION | DELIVERY PATTERN | DELIV-ERY STATUS | |
|---|---|---|---|---|---|---|---|---|
| MATERIAL FOR XX | 001 | xxx.xxx.xxx.xxx | ADAPTED | DONE | xxxx | DOCUMENT & APPLICATION | DELIV-ERED | ... |
| | | xxx.xxx.xxx.xxx | UN-ADAPTED | | | DOCUMENT & APPLICATION | DELIV-ERED | |
| ... | | | | | | | | |

FIG.14C

| DOCU-MENT NAME | ID | DELIVERY DESTINATION ADDRESS | DEVICE TYPE | VERSION CHECK | VERSION | DELIVERY PATTERN | DELIV-ERY STATUS | |
|---|---|---|---|---|---|---|---|---|
| MATERIAL FOR XX | 001 | xxx.xxx.xxx.xxx | ADAPTED | DONE | xxxx | DOCUMENT | DELIV-ERED | ... |
| | | xxx.xxx.xxx.xxx | UN-ADAPTED | | | DOCUMENT & APPLICATION | DELIV-ERED | |
| ... | | | | | | | | |

DOCUMENT MANAGEMENT APPARATUS AND DOCUMENT MANAGEMENT SYSTEM

CROSS-REFERENCE TO RELATED APPLICATIONS

The present application claims priority to and incorporates by reference the entire contents of Japanese Patent Application No. 2011-033608 filed in Japan on Feb. 18, 2011 and Japanese Patent Application No. 2011-253198 filed in Japan on Nov. 18, 2011.

BACKGROUND OF THE INVENTION

1. Field of the Invention

The present invention relates generally to document management apparatuses and document management systems, and more particularly, to collection of document browsing history.

2. Description of the Related Art

Delivering a document in electronic form over a network to a delivery destination, where the document is browsed using an information processing apparatus such as a personal computer (PC) has already been performed. In such document delivery, document information in an information format that can be browsed using a general information processing apparatus or document information in a system-specific information format is transmitted using an electronic mail, a file transfer protocol, or the like. At an information processing apparatus, which is a transmission destination, the document is browsed by a browsing method that suits the information format.

When a document is browsed using a projector or the like device that does not include a Large-capacity storage device, information (hereinafter, "display information") in HyperText Merkup Language (HTML) format or the like for displaying the document is transmitted over HyperText Transfer Protocol (HTTP). The projector or the like device, which has HTTP browsing function, displays the document according to the received HTML-format display information.

Besides, systems that make it possible to collect document browsing history in order to keep track of responses of browsing users by collecting and analyzing browsing activities performed on a document have been proposed (see, for example, Japanese Patent Application Laid-open No. 2008-27013). According to a technique disclosed in Japanese Patent Application Laid-open No. 2008-27013, document elements that have become a subject of browsing in document browsing are detected to thereby achieve keeping track of responses of browsing users.

However, the technique disclosed in Japanese Patent Application Laid-open No. 2008-27013 is on a premise that detection as to whether a delivered document is browsed and detection of browsed positions are performed by a browsing device for use by a browsing user of the document. Accordingly, as described above, in a situation where document information in a general-purpose information format is delivered and the document is then browsed with a general-purpose information processing apparatus or a situation where display information is received and displayed by a display device, such as a projector, it is difficult to even determine whether the delivered document is browsed, let alone keep track of response of a browsing user.

There is a need to solve a disadvantage such as that described above and to aim at enabling to keep track of browsing activities performed on a delivered document even in a situation where the document is browsed using a device that does not have a function of collecting document browsing history.

SUMMARY OF THE INVENTION

It is an object to at least partially solve the problems in the conventional technology.

According to an embodiment, there is provided a document management apparatus for delivering a to-be-delivered document to a delivery destination via a network and collecting information about browsing history of the document at the delivery destination. The document management apparatus includes: a delivery-pattern determining unit that obtains information about a type of a device, which is the delivery destination, and determines a delivery pattern for the document depending on the type of the device; a delivery-information generating unit that generates, based on the to-be-delivered document, information of the delivery pattern determined by the delivery-pattern determining unit; a document delivery unit that delivers the document by transmitting the information of the delivery pattern generated by the delivery-information generating unit to a network address of the delivery destination; and a browsing-history management unit that acquires information about browsing history at the delivery destination to which the document has been delivered, and stores the information about browsing history. The delivery-pattern determining unit, when the type of the device is a type not adapted to a function of collecting information about browsing history, determines that a pattern for delivering a program for implementing collection of the information about browsing history at the delivery destination device together with the document as the delivery pattern, and the delivery-information generating unit, when the pattern for delivering the program together with the document is determined as the delivery pattern, generates, in addition to the program and the document, associating information that associates the document with the program such that the program is to be executed when the document is browsed.

According to another embodiment, there is provided a document management system that includes: a document management apparatus for delivering a to-be-delivered document to a delivery destination via a network and collecting information about browsing history of the document at the delivery destination. The document management apparatus includes: a delivery-pattern determining unit that obtains information about a type of a device, which is the delivery destination, and determines a delivery pattern for the document depending on the type of the device; a delivery-information generating unit that generates, based on the to-be-delivered document, information of the delivery pattern determined by the delivery-pattern determining unit; a document delivery unit that delivers the document by transmitting the information of the delivery pattern generated by the delivery-information generating unit to a network address of the delivery destination; and a browsing-history management unit that acquires information about browsing history at the delivery destination to which the document has been delivered, and stores the information about browsing history. The delivery-pattern determining unit, when the type of the device is a type not adapted to a function of collecting information about browsing history, determines that a pattern for delivering a program for implementing collection of the information about browsing history at the delivery destination device together with the document as the delivery pattern, and the delivery-information generating unit, when the pattern for delivering the program together with the document is determined as the delivery pattern, generates, in addition to the program and the document, associating information that associates the document with the program such that the program is to be executed when the document is browsed.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 1 is a diagram illustrating a form of operation of a document management system according to a first embodiment;

FIG. 2 is a block diagram schematically illustrating a hardware configuration of a document management apparatus according to the first embodiment;

FIG. 4 is a diagram illustrating an example of output destination information according to the first embodiment;

FIG. 5 is a diagram illustrating an example of browsing history information according to the first embodiment;

FIG. 11 is a flowchart illustrating a delivery-pattern determining operation according to the first embodiment;

FIGS. 14A to 14C are diagrams illustrating an example of output destination information according to the first, embodiment;

DETAILED DESCRIPTION OF THE PREFERRED EMBODIMENTS

Figure 3:
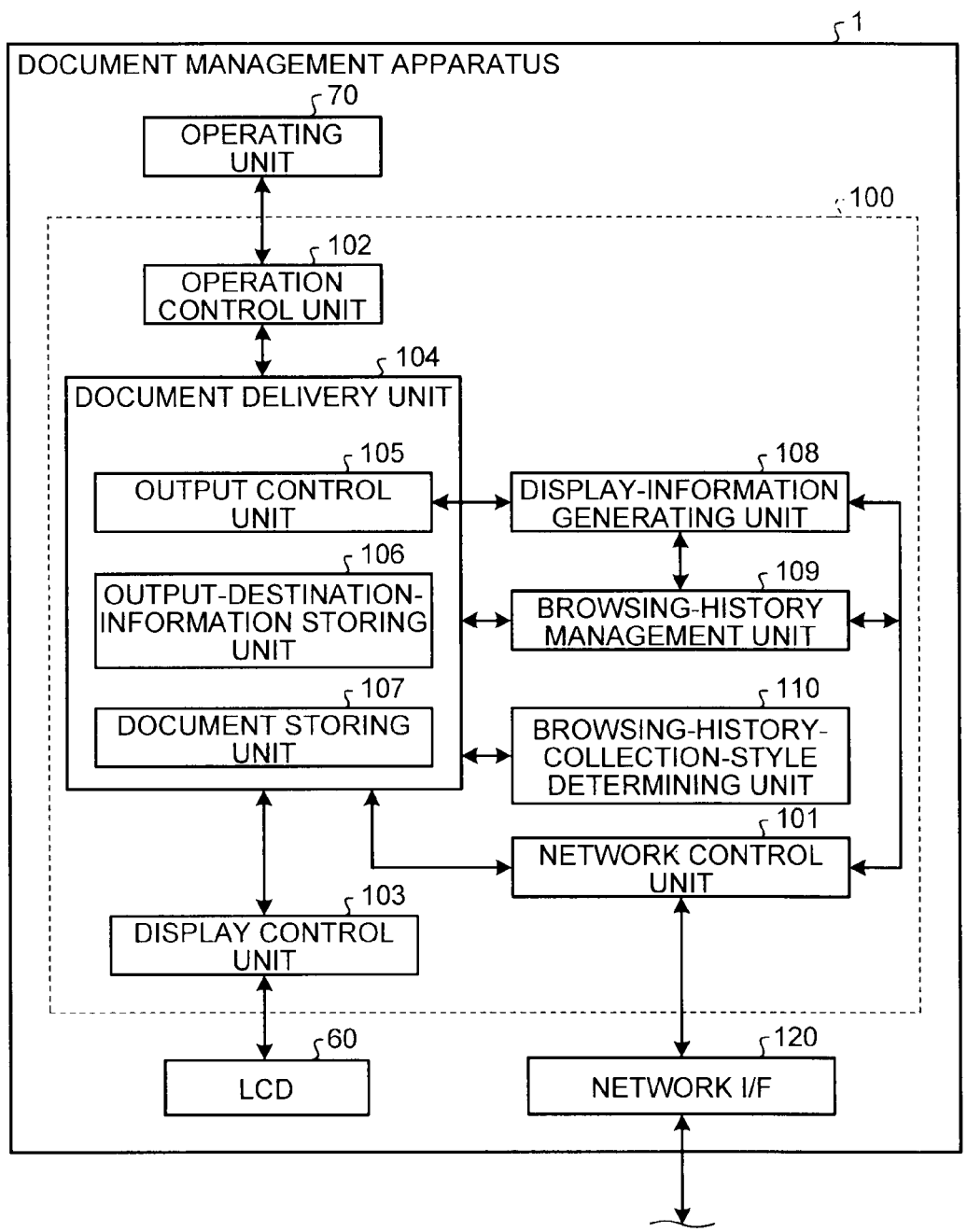
FIG. 3 is a block diagram illustrating a functional configuration of the document management apparatus according to the first embodiment.

Preferred embodiments are described in detail below with reference to the accompanying drawings. In the embodiments, systems that deliver document information over a network are taken as an example of a document management system, and systems that determine a delivery pattern depending on a delivery destination of a document are described.

First Embodiment

FIG. 1 is a diagram illustrating an example form of operation of a document management system according to a first embodiment. As illustrated in FIG. 1, the document management system according to the first embodiment includes a document management apparatus 1, which is a delivery source of a document, and to be operated by an operator, and an unadapted client 2, an adapted client 3, and a projector 4, each being a delivery destination of the document and to be operated by a user. These are connected to a network, in which the document management system is put into operation.

As described above, the document management apparatus 1 is the delivery source of the document, and determines a delivery pattern depending on a type of a delivery destination device, to which the document is to be delivered and delivers the document in a pattern according to a result of the determination. The unadapted client 2 and the adapted client 3 are each implemented in a general-purpose information processing apparatus, such as a personal computer (PC), and differ from each other according to whether it has a function adapted to the document management apparatus 1 according to the first embodiment.

The function adapted to the document management, apparatus 1 according to the first embodiment is, more specifically, a function of collecting browsing history to support a document management function provided by the document management apparatus 1. In the first embodiment, distinction between the unadapted client 2 and the adapted client 3 is made according to whether an application program that implements the function of collecting browsing history is installed. More specifically, a PC, on which the application program is installed, is the adapted client 3, while a PC, on which the application program is not installed, is the unadapted client 2.

The projector 4 is a projecting device that can acquire display information over the network and project the display information on a screen or the like. The projector 4 according to the first embodiment has an information processing function that supports execution of an HTML browser application and performs projection by acquiring information in HyperText Markup Language (HTML) format as display information. Note that, in the first embodiment, the projector 4 is an example of a display device capable of display only in a specific information format(s), such as HTML described above, contrasted with a general-purpose information processing apparatus, such as a PC, capable of display in various information formats.

Hardware configurations of the document management apparatus 1, the unadapted client 2, the adapted client 3, and the projector 4 according to the first embodiment are described below. FIG. 2 is a block diagram illustrating the hardware configuration of the document management apparatus 1 according to the first embodiment. Hereinafter, by way of example, the hardware configuration of the document management apparatus 1 is described; however, the hardware configurations of the unadapted client 2, the adapted client 3, and the projector 4 are also similar thereto.

As illustrated in FIG. 2, the document management apparatus 1 according to the first embodiment has a configuration similar to that of a typical server, a PC, or the like. More specifically, the document management apparatus 1 according to the first embodiment includes a central processing unit (CPU) 10, random access memory (RAM) 20, read only memory (ROM) 30, a hard disk drive (HDD) 40, and an interface (I/F) 50 that are connected to one another via a bus 80. A liquid crystal display (LCD) 60 and an operating unit 70 are also connected to the I/F 50.

The CPU 10 is calculating means that controls operations of the overall document management apparatus 1. The RAM 20 is a volatile storage medium, to and from which information can be written and read at high speed, and used as a working area during information processing by the CPU 10. The ROM 30 is a read-only nonvolatile storage medium, in which programs, such as firmware, are stored. The HDD 40 is a nonvolatile storage medium, to and from which information can be written and read. An operating system (OS), various types of control programs, application programs, and the like are to be stored in the HDD 40.

The I/F 50 connects between and performs control of the bus 80 and various types of hardware, a network, and the like. The LCD 60 is a visual user interface for use by a user to obtain information about a status of the document management apparatus 1. The operating unit 70 is a user interface, such as a keyboard and/or a mouse, for use by the user to input information to the document management apparatus 1. Note that the projector 4 includes, in lieu of the LCD 60, a projecting unit for projecting an image.

In a hardware configuration such as that described above, a program stored in the ROM 30, the HDD 40, or a storage medium (not shown), such as an optical disk, is loaded into the RAM 20 and executed under control of the CPU 10, thereby building a software control section. A combination of the software control section built in this manner and hardware constitute functional blocks that implement functions of the document management apparatus 1, the unadapted client 2, the adapted client 3, and the projector 4 according to the first embodiment.

A functional configuration of the document management apparatus 1 according to the first embodiment is described below with reference to FIG. 3. FIG. 3 is a block diagram illustrating the functional configuration of the document management apparatus 1 according to the first embodiment. As illustrated in FIG. 3, the document management apparatus 1 according to the first embodiment includes, in addition to the LCD 60 and the operating unit 70 described above with reference to FIG. 2, a controller 100 and a network I/F 120. The controller 100 includes a network control unit 101, an operation control unit 102, a display control unit 103, a document delivery unit 104, a display-information generating unit 108, a browsing-history management unit 109, and a browsing-history-collection-style determining unit 110. Furthermore, the document delivery unit 104 includes an output control unit 105, an output-destination-information storing unit 106, and a document storing unit 107.

The network I/F 120 is an interface for use by the document management apparatus 1 to carry out communications with other equipment over the network. As the network I/F 120, an Ethernet (registered trademark) or universal serial bus (USB) interface can be used. The network I/F 120 is implemented in the I/F 50 illustrated in FIG. 2.

The controller 100 includes a combination of software and hardware. More specifically, the controller 100 includes hardware, such as integrated circuit, and the software control section that is built by the CPU 10 by performing computations according to a program stored in a nonvolatile storage medium, such as the ROM 30, a nonvolatile memory, the HDD 40, or an optical disk, and loaded into a volatile memory (hereinafter, "memory"), such as the RAM 20. The controller 100 is a control unit that controls the overall document management apparatus 1. The network control unit 101 acquires information input via the network I/F 120 and also transmits information to other equipment via the network I/F 120.

The operation control unit 102 acquires operating signals representing an operation performed by an operator through the operating unit 70 and inputs the signals to a module, such as the document delivery unit 104, that operates in the document management apparatus 1. The display control unit 103 causes the LCD 60 to display a status, such as a graphical user interface (GUI) of the document delivery unit 104, of the document management apparatus 1.

The document delivery unit 104 controls a document delivery process in the document management apparatus 1. The output control unit 105 processes document output, which is a major function of the document delivery unit 104. The output-destination-information storing unit 106 stores, for each of documents to be delivered by the document delivery unit 104, delivery destination information that is associated with various information pieces about a delivery destination, to which a document is to be delivered. The document storing unit 107 stores information about the documents to be delivered. The output control unit 105 is implemented in a software control section such as that described above. The output-destination-information storing unit 106 and the document storing unit 107 are implemented in a combination of the software control section and a storage medium, such as the HDD 40.

FIG. 4 is a diagram illustrating an example of the output destination information stored in the output-destination-information storing unit 106. As illustrated in FIG. 4, in the output-destination-information storing unit 106 according to the first embodiment, "document name," which indicates a name of a to-be-delivered document, and "ID" for identification of the document are associated with a plurality of "delivery destination addresses," which indicate delivery destinations of the document, "device type," which indicates which one of the unadapted client 2, the adapted client 3, and the projector 4 each of the delivery destinations is, "delivery pattern," which indicates a delivery pattern that depends on the device type, and "delivery status" of delivery to each of the delivery destinations.

Meanwhile, in the first embodiment, "delivery destination addresses" in Internet Protocol (IP) address format are used. These are IP addresses of the unadapted client 2, the adapted client 3, and the projector 4 described above. Any other information, such as an e-mail address or other identification information, that allows unique identification of a device on the network can be similarly employed as "delivery destination addresses."

In a case where the document delivery unit 104 delivers document information to a delivery destination, which is a display device, such as the projector 4, the display-information generating unit 108 generates an information format, such as the HTML format described above, that can be displayed on the display device. The browsing-history management unit 109 manages information about browsing history collected from the devices illustrated in FIG. 1 by the document management apparatus 1 based on browsing history information such as that illustrated in FIG. 5.

As illustrated in FIG. 5, in the browsing history information according to the first embodiment, "document ID," which is identification information for identifying a delivered document and corresponds to "ID" illustrated in FIG. 4, is associated with a plurality of "delivery destination addresses," which indicate delivery destinations of the document, "history collection status," which indicates whether browsing history has been collected from each of the delivery destinations, and "history ID," which is identification information for identifying each information piece of browsing history collected from the delivery destinations. The browsing-history management unit 109 stores information about browsing history, which is associated with "history ID" illustrated in FIG. 5, that indicates how each of the documents has been browsed at each of delivery destinations.

The browsing-history-collection-style determining unit 110 obtains information about a method of collecting browsing history from a delivery destination, to which the document is to be delivered, based on "device type" illustrated in FIG. 4 and determines a delivery pattern, in which the document is to be delivered, according to the obtained information. Put another way, the browsing-history-collection-style determining unit 110 functions as a delivery-pattern determining unit. The browsing-history-collection-style determining unit 110 controls generation of information to be ultimately delivered according to a result of the determination.

Figure 6:
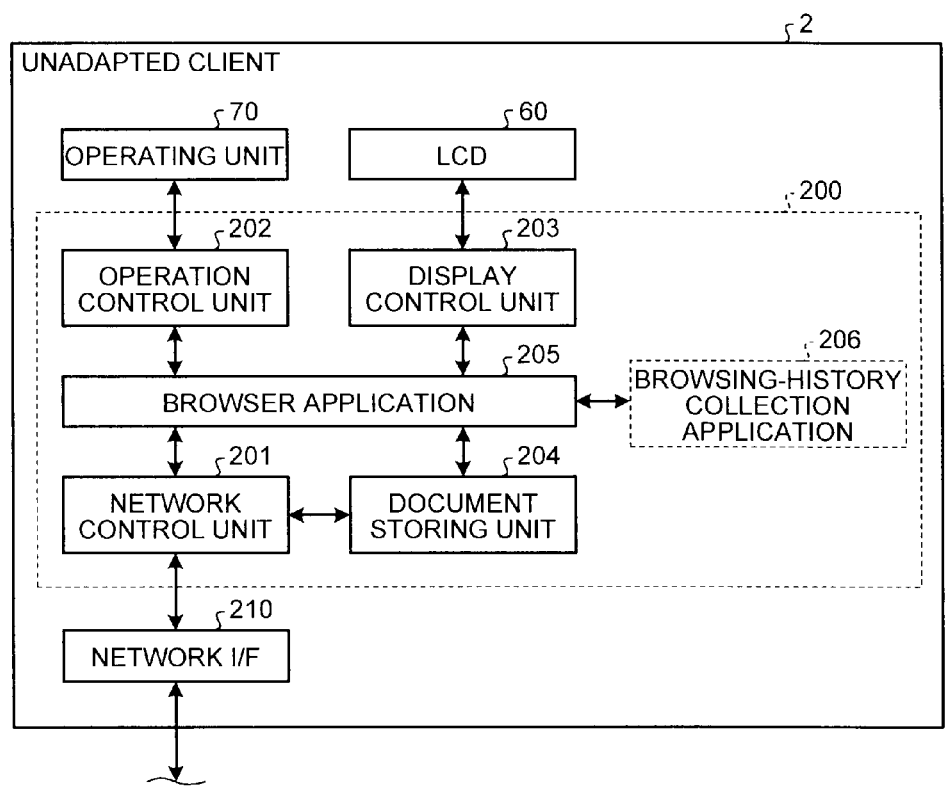
FIG. 6 is a diagram illustrating a functional configuration of an unadapted client according to the first embodiment.

FIG. 6 is a block diagram illustrating a functional configuration of the unadapted client 2 according to the first embodiment. As illustrated in FIG. 6, the unadapted client 2 according to the first embodiment includes, in addition to the LCD 60 and the operating unit 70 described above with reference to FIG. 2, a controller 200 and a network I/F 210. The controller 200 includes a network control unit 201, an operation control unit 202, a display control unit 203, a document storing unit 204, a browser application 205, and a browsing-history collection application 206.

The network I/F 210 is an interface for use by the unadapted client 2 to carry out communications with other equipment over the network. As the network I/F 210, an Ethernet (registered trademark) or universal serial bus (USB) interface can be used. The network I/F 210 is implemented in the I/F 50 illustrated in FIG. 2.

The controller 200 includes a combination of software and hardware and is a control unit that controls the overall unadapted client 2. The network control unit 201 acquires information input via the network I/F 210 and also transmits information to other equipment via the network I/F 210.

The operation control unit 202 acquires operating signals representing an operation performed by an operator through the operating unit 70 and inputs the signals to a module that operates in the controller 200 of the unadapted client 2. The display control unit 203 causes the LCD 60 to display a status, such as a graphical user interface (GUI) of the browser application 205, of the unadapted client 2. The document storing unit 204 stores information about a document delivered from the document management apparatus 1.

The browser application 205 performs a process for displaying the document delivered from the document management apparatus 1 and stored in the document storing unit 204 on the LCD 60 via the display control unit 203. The browser application 205 is provided by the CPU 10 by performing computations according to an application program that is installed on the HDD 40 or the like in the unadapted client 2 and loaded into the RAM 20. The browser application 205 is not limited to one type, and may be provided in a plurality of types to correspond to types of documents to be displayed.

While document information delivered from the document management apparatus 1 is browsed by a user using the browser application 205, the browsing-history collection application 206 acquires and accumulates information about browsing history according to browsing activities of the user. The browsing-history collection application 206 acquires information about browsing history in response to, for instance, operations performed by the user through the operating unit 70 while the document is being browsed using the browser application 205. As a process for acquiring the information about browsing history, description format that is known can be employed, and detailed description is omitted.

As indicated by dashed lines in FIG. 6, the browsing-history collection application 206 is a module that is built and executed when the browser application 205 performs processing to display a document stored in the document storing unit 204 rather than a module that is constantly built in the unadapted client 2. More specifically, when the browser application 205 reads the document stored in the document storing unit 204 to perform processing to display the document, a program that is attached to the document and delivered with the document is loaded into the RAM 20, and the CPU 10 performs computations according to the program, thereby temporarily building the browsing-history collection application 206.

This configuration of the browsing-history collection application 206 makes it possible to collect browsing history even from the unadapted client 2 that is unadapted to the function of collecting browsing history provided by the document management apparatus 1.

Figure 7:
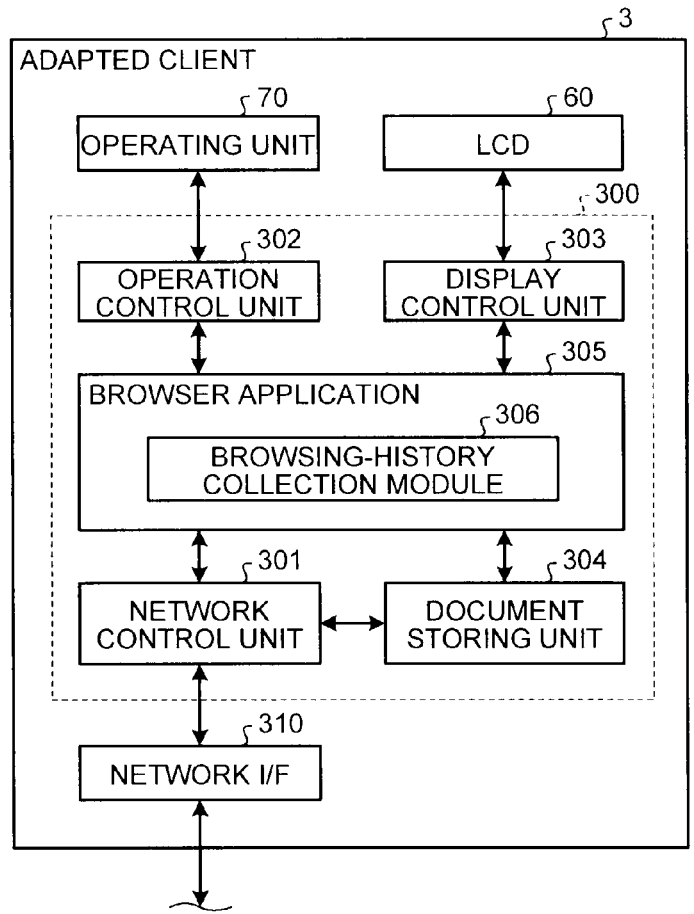
FIG. 7 is a diagram illustrating a functional configuration of an adapted client according to the first embodiment.

FIG. 7 is a block diagram illustrating a functional configuration of the adapted client 3. As illustrated in FIG. 7, the adapted client 3 is substantially same in configuration as the unadapted client illustrated in FIG. 6 but differs in including a browsing-history collection module 306 as an internal module of a browser application 305 rather than including the browsing-history collection application 206. This makes it possible that, in the adapted client 3, the browsing-history collection module 306, which is a function incorporated in the browser application 305, collects document browsing history without building the browsing-history collection application 206 each time when browsing a document. Numerals 300, 302, 303, 304, and 310 in FIG. 7 correspond respectively to numerals 200, 202, 203, 204, and 210 in FIG. 6.

Figure 8:
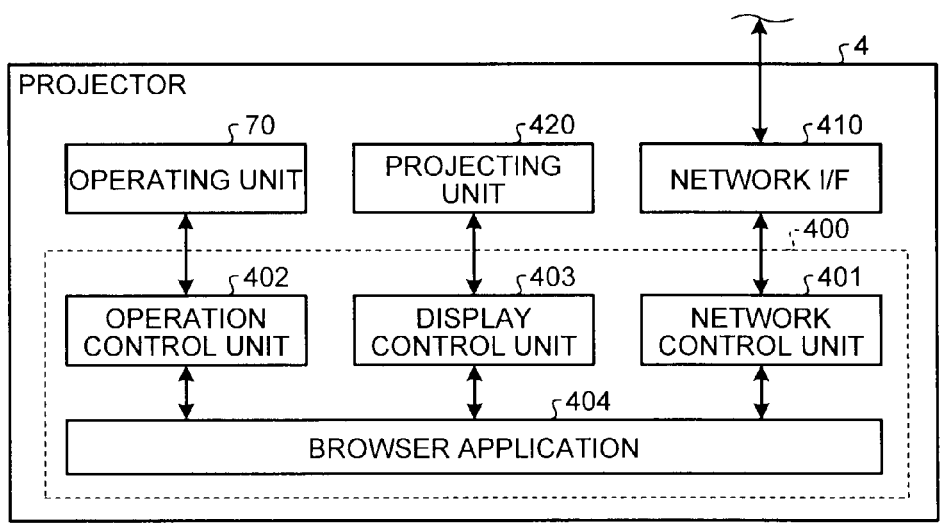
FIG. 8 is a diagram illustrating a functional configuration of a projector according to the first embodiment.

FIG. 8 is a block diagram illustrating a functional configuration of the projector 4 according to the first embodiment. As illustrated in FIG. 8, the projector 4 according to the first embodiment includes, in addition to the operating unit 70 described above with reference to FIG. 2, a controller 400, a network I/F 410, and a projecting unit 420. The controller 400 includes a network control unit 401, an operation control unit 402, a display control unit 403, and a browser application 404.

The network I/F 410 is an interface for use by the projector 4 to carry out communications with other equipment over the network. As the network I/F 410, an Ethernet (registered trademark) or universal serial bus (USB) interface can be used. The network I/F 410 is implemented in the I/F 50 illustrated in FIG. 2. The projecting unit 420 projects an image according to display information processed in the projector 4.

The controller 400 includes a combination of software and hardware and is a control unit that controls the overall projector 4. The network control unit 401 acquires information input via the network I/F 410 and also transmits information to other equipment via the network I/F 410.

The operation control unit 402 acquires operating signals representing an operation performed by an operator through the operating unit 70 and inputs the signals to a module that operates in the controller 400 of the projector 4. The display control unit 403 causes image information, such as a GUI of the browser application 404, processed by the projector 4 to be projected by the projecting unit 420.

Figure 9:
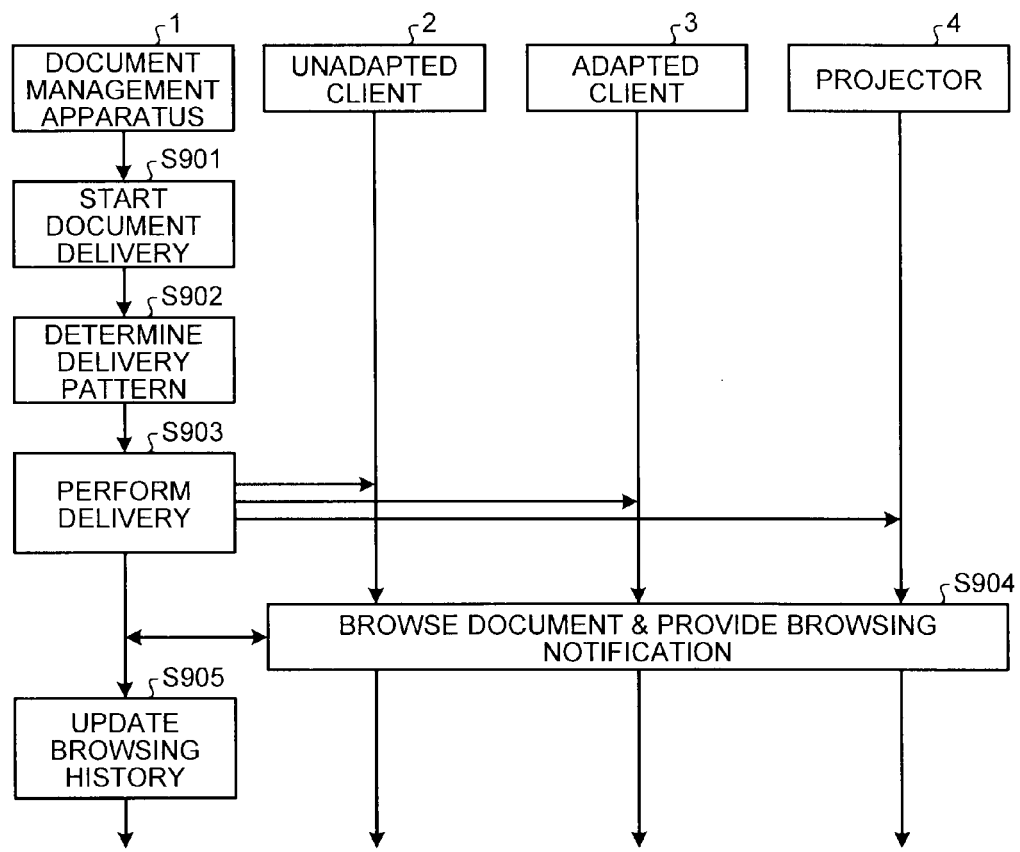
FIG. 9 is a sequence diagram illustrating operations of the overall document management system according to the first embodiment.

Operations of the document management system according to the first embodiment are described below. FIG. 9 is a sequence diagram illustrating the operations of the overall document management system according to the first embodiment. As illustrated in FIG. 9, in the document management system according to the first embodiment, the document management apparatus 1 starts a document delivery process in response to operator's operation (S901). Upon starting the document delivery process, the document management apparatus 1 determines a delivery pattern as to in what pattern a to-be-delivered document is to be arranged (S902), and delivers the to-be-delivered document to each of delivery destinations in a pattern that depends on a result of the determination (S903).

The unadapted client 2, the adapted client 3, or the projector 4 displays or projects the document delivered from the document management apparatus 1 according to a user operation to thereby allow the user to browse the document, and simultaneously provides a notification, which varies among the unadapted client 2, the adapted client 3, and the projector 4, to the document management apparatus 1 (S904). Upon receiving the notification from each of the unadapted client 2, the adapted client 3, and the projector 4, the document management apparatus 1 updates browsing history information according to each notification (S905). The operations of the document management system according to the first embodiment are completed by performing the process as described above. Each of the operations is described in detail below.

Figure 10:
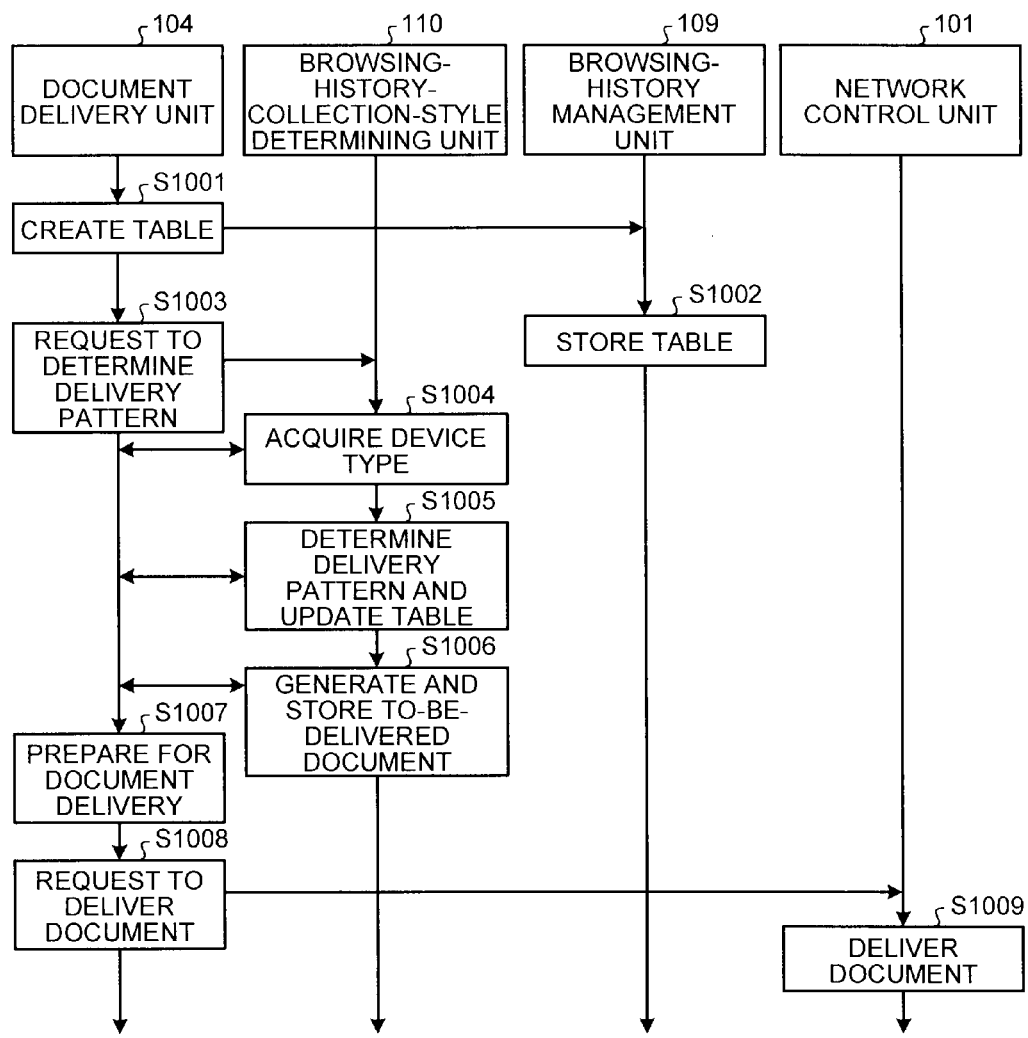
FIG. 10 is a sequence diagram illustrating document delivery operations according to the first embodiment.

FIG. 10 is a sequence diagram illustrating operations of the document management apparatus 1 from, after document delivery is started, determination of a delivery format to delivery of the document in the document management system according to the first embodiment. When document delivery is started, a to-be-delivered document, a document name, which is the name of the document, and a delivery destination address, to which the document is to be delivered, are input by operator's operation of the document management apparatus 1. The input document is stored in the document storing unit 107. The output-destination-information storing unit 106 determines "document name," "ID," "delivery destination address," and "device type" based on the input information and stores output destination information such as that illustrated in FIG. 4.

The determination of "device type" by the output-destination-information storing unit 106 may be performed according to an input entered by the operator, or, alternatively, by the output-destination-information storing unit 106 based on input "delivery destination addresses." In this case, the output-destination-information storing unit 106 determines "device type" related to each "delivery destination address" based on information in which "delivery destination addresses" are associated with "device types." As the information in which "delivery destination addresses" are associated with "device types," output destination information about a document delivered in the past can be used.

When the document delivery process is started, as illustrated in FIG. 10, the output control unit 105 of the document delivery unit 104 requests the browsing-history management unit 109 to generate browsing history information (referred to as TABLE in FIG. 10) (S1001). In response thereto, the browsing-history management unit 109 determines a document ID and a delivery destination address and stores browsing history information such as that illustrated in FIG. 5 (S1002).

Next, the output control unit 105 of the document delivery unit 104 requests the browsing-history-collection-style determining unit 110 to determine a delivery pattern for the document (S1003). Upon receiving the request from the output control unit 105, the browsing-history-collection-style determining unit 110 accesses the output destination information, which is newly stored in the output-destination-information storing unit 106 as the document delivery process has started, to acquire information about "device type" for each of the delivery destination addresses, to which the document is to be delivered (S1004).

The browsing-history-collection-style determining unit 110 that has acquired the information about "device type" determines the delivery pattern based on the information, and updates a value of "delivery pattern" illustrated in FIG. 4 in the output destination information stored in the output-destination-information storing unit 106 (S1005). The browsing-history-collection-style determining unit 110 acquires the document from the document storing unit 107, generates to-be-delivered information according to the delivery pattern determined at S1005 for each of the delivery destination addresses, to which the document is to be delivered, and causes the document storing unit 107 to store the information again (S1006). Meanwhile, at S1006, in some cases, which depend on the device type of the delivery destination, not the to-be-delivered document but network address information for accessing the document can be generated. This will be described in detail later.

When processing at S1006 is completed and the to-be-delivered information has been stored in the document storing unit 107, the output control unit 105 of the document delivery unit 104 prepares for document delivery by acquiring the delivery destination addresses from the output-destination-information storing unit 106 and simultaneously acquiring the to-be-delivered information from the document storing unit 107 (S1007). The output control unit 105 inputs the delivery destination addresses and the to-be-delivered information to the network control unit 101 and requests the network control unit 101 to deliver the document (S1008). According to the request from the output control unit 105, the network control unit 101 delivers the document (S1009). Put another way, the output control unit 105 functions as a document delivery unit at S1008 and S1009.

Processing at S1005 and S1006 illustrated in FIG. 10 is described in detail below. FIG. 11 is a flowchart illustrating a delivery-pattern determining operation and a delivery-information generating operation to be performed by the browsing-history-collection-style determining unit 110 according to the first embodiment. As illustrated in FIG. 11, first, the browsing-history-collection-style determining unit 110 obtains information about the delivery destination device type based on the output destination information acquired from the output-destination-information storing unit 106 at S1004 (S1101). If, according to the obtained information, the delivery destination type is the adapted client (YES at S1102), the browsing-history-collection-style determining unit 110 determines that only the to-be-delivered document is to be delivered (S1103).

If the delivery destination type is not the adapted client (NO at S1102) but the unadapted client (YES at S1104), the browsing-history-collection-style determining unit 110 determines that the to-be-delivered document is to be delivered with a program for configuring the browsing-history collection application 206, which has been described with reference to FIG. 6, attached thereto (S1105). If the delivery destination type is even not the unadapted client (NO at S1104), the delivery destination type is the projector 4, which is "display-only"; accordingly, the browsing-history-collection-style determining unit 110 determines that display information in HTML format or the like is to be delivered (S1106).

More specifically, when the device type, information about which is obtained using the delivery destination address, of the delivery destination is neither adapted to the function of collecting browsing history provided by the document management apparatus 1 nor capable of executing the program, such as the browsing-history collection application 206, the browsing-history-collection-style determining unit 110 determines display information, such as HTML, to be the delivery pattern, i.e. the mode used in the delivery. Meanwhile, information that is delivered first after processing at S1106 is done is address information, such as uniform resource locator (URL), for accessing the HTML-format information. Put another way, the browsing-history-collection-style determining unit 110 determines that a pattern, such as HTML format, of the display address information for accessing the display information is the delivery pattern at S1106.

The browsing-history-collection-style determining unit 110 repeatedly performs the operations from S1101 to S1106 for all the delivery destination addresses associated with the document ID of the to-be-delivered document (NO at S1107). When the operations have been completed for all the delivery destination addresses (YES at S1107), the browsing-history-collection-style determining unit 110 determines whether processing at S1105 is performed even once, or, put another way, whether it is necessary to attach and deliver the program for configuring the browsing-history collection application 206 (S1108).

Figures 12A, 12B:
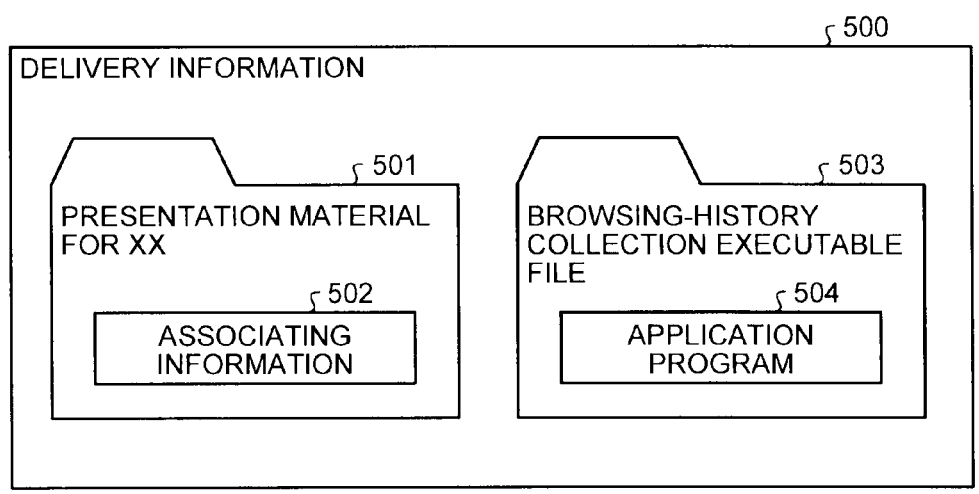
FIGS. 12A and 12B are diagrams illustrating an example of delivery information according to the first embodiment.

When, as a result of the determination made at S1108, it is determined that the program needs to be delivered (YES at S1108), as illustrated in FIG. 12A, the browsing-history-collection-style determining unit 110 generates delivery information 500 that contains a to-be-delivered document 501 and a browsing-history collection executable file 503 that includes an application program 504 for configuring the browsing-history collection application 206 (S1109). As illustrated in FIG. 12B, the browsing-history-collection-style determining unit 110 generates associating information 502 that associates the to-be-delivered document 501 with the browsing-history collection executable file 503, which is the program for configuring the browsing-history collection application 206 (S1110), and exits the process.

By performing the process in this way, when a document is to be delivered to the unadapted client 2, delivery information such as the delivery information 500 illustrated in FIGS. 12A and 12B is generated and transmitted. Accordingly, when a document is browsed using the unadapted client 2 that does not have the function of collecting browsing history, which is the function for supporting the document management function provided by the document management apparatus 1, the browsing-history collection executable file 503 is executed according to the associating information illustrated in FIG. 12B and the browsing-history collection application 206 is configured. This makes it possible for the unadapted client 2 to collect information about browsing history as in the case of the adapted client 3.

When a delivery destination of a document is the adapted client 3, collection of browsing history is carried out by the browsing-history collection module 306; accordingly, information about browsing history can be collected by delivering only the document.

Besides, extension of the function of collecting browsing history of the document management apparatus 1 can develop different versions of the browsing-history collection module 306. More specifically, there can be a case where a version of the browsing-history collection module 306 in the adapted client 3, which was put into service long before, has become old, and browsing history collection cannot be performed in a manner sufficiently adapted to the function of collecting browsing history provided by the document management apparatus 1.

In addition, although it is assumed in FIG. 11 that "device type" has already been determined in the output-destination-information storing unit 106, in a case where an operator does not input the device type, and, furthermore, the output-destination-information storing unit 106 does not have information associated with the delivery destination address, information about, "device type" cannot be obtained, and therefore the delivery pattern cannot be determined. A modification to address these problems is described with reference to FIG. 13.

Figure 13:
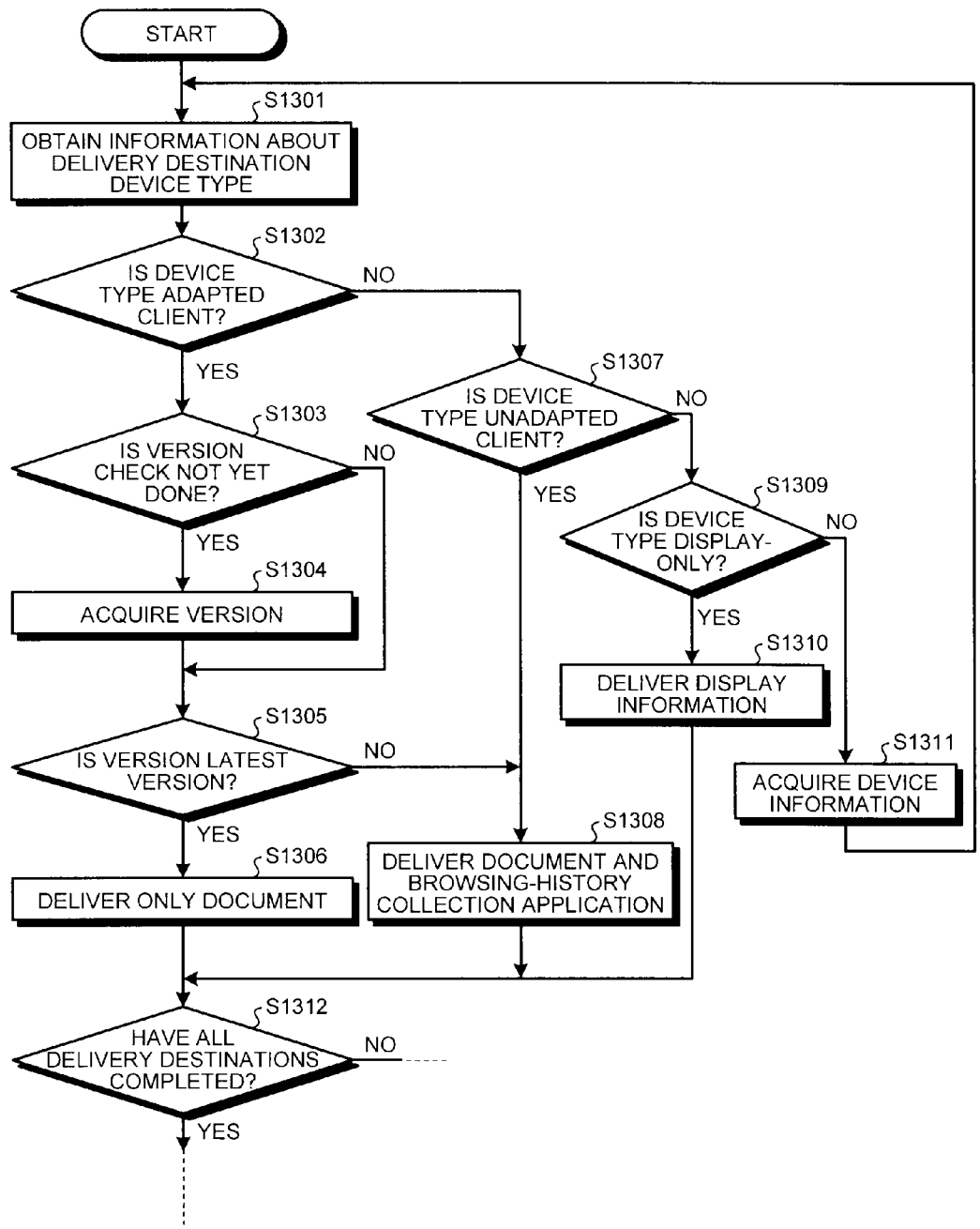
FIG. 13 is a flowchart illustrating a delivery-pattern determining operation according to the first embodiment.

FIG. 13 is a flowchart illustrating operations of the browsing-history-collection-style determining unit 110 in the modification. As illustrated in FIG. 13, processing at S1301 and S1302 is performed as in S1101 and S1102 of FIG. 11. Note that in the modification illustrated in FIG. 13, output destination information illustrated in FIGS. 14A to 14C rather than the output destination information illustrated in FIG. 4 is used. As illustrated in FIGS. 14A to 14C, in the output destination information according to the modification, in addition to the output destination information illustrated in FIG. 4, information about "version check" and "version" is associated with each of the delivery destination addresses.

Information about "version" illustrated in FIGS. 14A to 14C is information indicating, in a case where a device type of a delivery destination is an adapted device, a version of the browsing-history collection module 306 of the adapted device. Information about "version check" is information indicating, in the case where the device type of the delivery destination is the adapted device, whether version check of the browsing-history collection module 306 of the adapted device has been done.

If the delivery destination type is the adapted client (YES at S1302), the browsing-history-collection-style determining unit 110 refers to "version check" such as that illustrated in FIGS. 14A to 14C (S1303). If, as illustrated in FIG. 14A, version check is not done yet (YES at S1303), the browsing-history-collection-style determining unit 110 accesses the target adapted client 3 via the network control unit 101 to acquire information about the version of the browsing-history collection module 306 (S1304), and updates information about "version check" and "version" in output destination information such as that illustrated in FIGS. 14A to 14C.

If processing at S1304 is completed or version check is done (NO at S1303), the browsing-history-collection-style determining unit 110 determines whether the version of the browsing-history collection module 306 of the adapted client 3, which is the delivery destination, is the latest version (S1305). If the version is the latest version (YES at S1305), the browsing-history-collection-style determining unit 110 determines that only the document is to be delivered as in S1103 of FIG. 11 (S1306). As a result, output destination information such as that illustrated in FIG. 14C is generated.

If the version is not the latest version (NO at S1305), the browsing-history-collection-style determining unit 110 determines that the document is to be delivered with the program for configuring the browsing-history collection application 206 attached thereto as in S1105 of FIG. 11 (S1308). As a result, output destination information such as that illustrated in FIG. 14B is generated.

Information, in which document information and a browsing-history collection executable file are associated with each other, such as that described with reference to FIGS. 12A and 12B is to be delivered according to a result of determination made at S1308. Accordingly, the browsing-history collection application is to be configured even in the adapted client 3 when a department is browsed as illustrated in FIG. 6. This causes browsing history collection adapted to latest function to be performed.

Processing at S1307 is executed as in S1104. If the delivery destination type is even not the unadapted client (NO at S1307), the browsing-history-collection-style determining unit 110 determines whether the device type is display-only (S1309). If the device type is display-only, the browsing-history-collection-style determining unit 110 determines that display information is to be delivered as in S1106 (S1310).

If the device type is even not display-only (NO at S1309), it is indicated that the device type is not checked yet; therefore, the browsing-history-collection-style determining unit 110 accesses the target delivery destination via the network control unit 101 to thereby acquire information about the device type (S1311), and repeats processing from S1301. Processing at S1312 and subsequent steps is executed as in S1107 and subsequent steps.

According to the modification illustrated in FIG. 13, as described above, even when the version of the browsing-history collection module 306 included in the adapted client 3 is old, the browsing-history collection application is configured, and collection of browsing history adapted to the latest function in keeping with extension of the function of the browsing history of the document management apparatus 1 is performed. Furthermore, even when the device type is unknown to the document management apparatus 1, the device type can be acquired, and a delivery pattern for the document can be determined.

Figure 15:
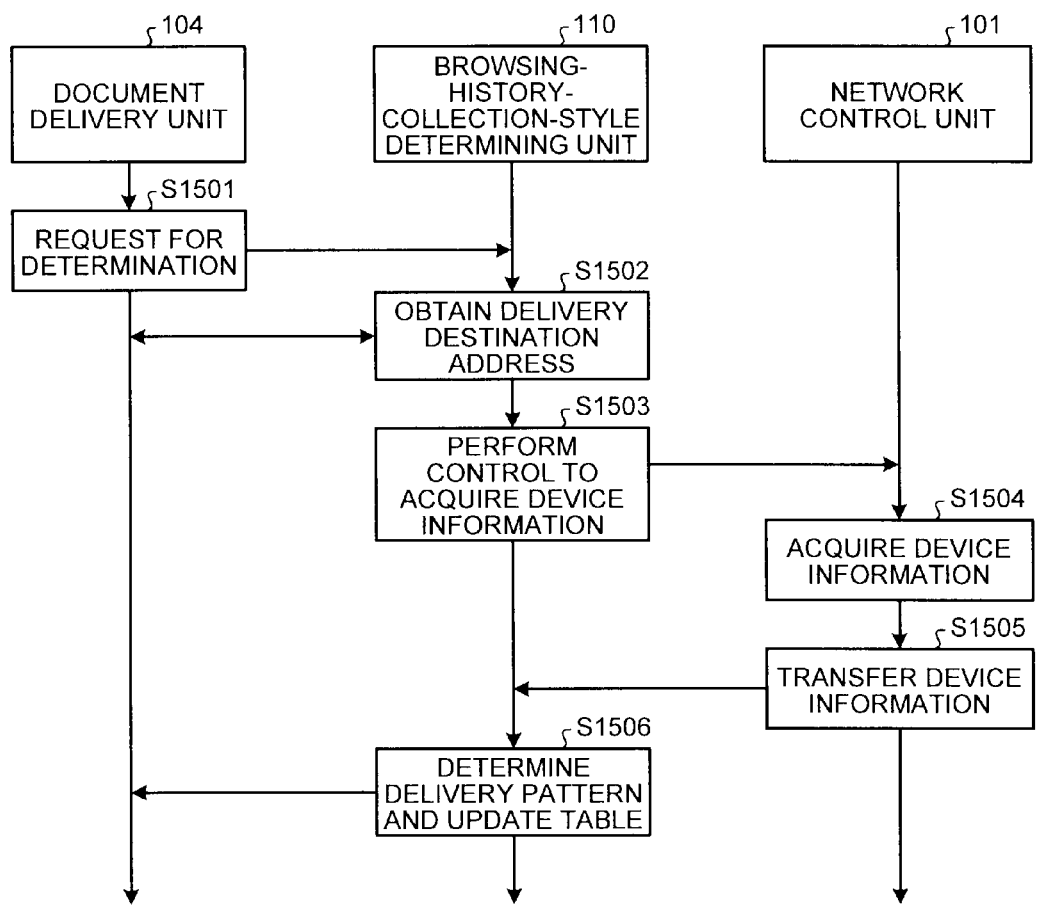
FIG. 15 is a sequence diagram illustrating a device-information acquiring operation according to the first embodiment.

A sequence of delivery-status determining operations that include the operation of acquiring version information or device information at S1304 and S1311 is described below with reference to the sequence diagram of FIG. 15. As illustrated in FIG. 15, when the output control unit 105 of the document delivery unit 104 requests the browsing-history-collection-style determining unit 110 to determine a delivery pattern (S1501), the browsing-history-collection-style determining unit 110 acquires a delivery destination address of a target of delivery pattern determination from the output-destination-information storing unit 106 of the document delivery unit 104 (S1502). At this time, the output destination information contains neither information about "device type" nor information about "version" illustrated in FIGS. 14A to 14C.

Upon acquiring the delivery destination address, the browsing-history-collection-style determining unit 110 controls the network control unit 101 so as to acquire device information from the target device based on the delivery destination address (S1503). The network control unit 101 accesses the delivery destination device via the network and acquires the device information according to the control of the browsing-history-collection-style determining unit 110 (S1504), and transfers the acquired device information to the browsing-history-collection-style determining unit 110 (S1505).

Upon receiving the device information transferred from the network control unit 101, the browsing-history-collection-style determining unit 110 determines the delivery pattern based on the acquired device information, updates the output destination information stored in the output-destination-information storing unit 106 (S1506), and exits the process.

Meanwhile, the example where the browsing-history-collection-style determining unit 110 acquires device information via the network has been described with reference to FIG. 13 and FIG. 15. Alternatively, the document management apparatus 1 may be configured to control the display control unit 103 to thereby cause the LCD 60 to display a message that prompts an operator to input a version and/or a device type. Information input by the operator according to this message allows determining a delivery pattern in a manner similar to that described above.

Figure 16:
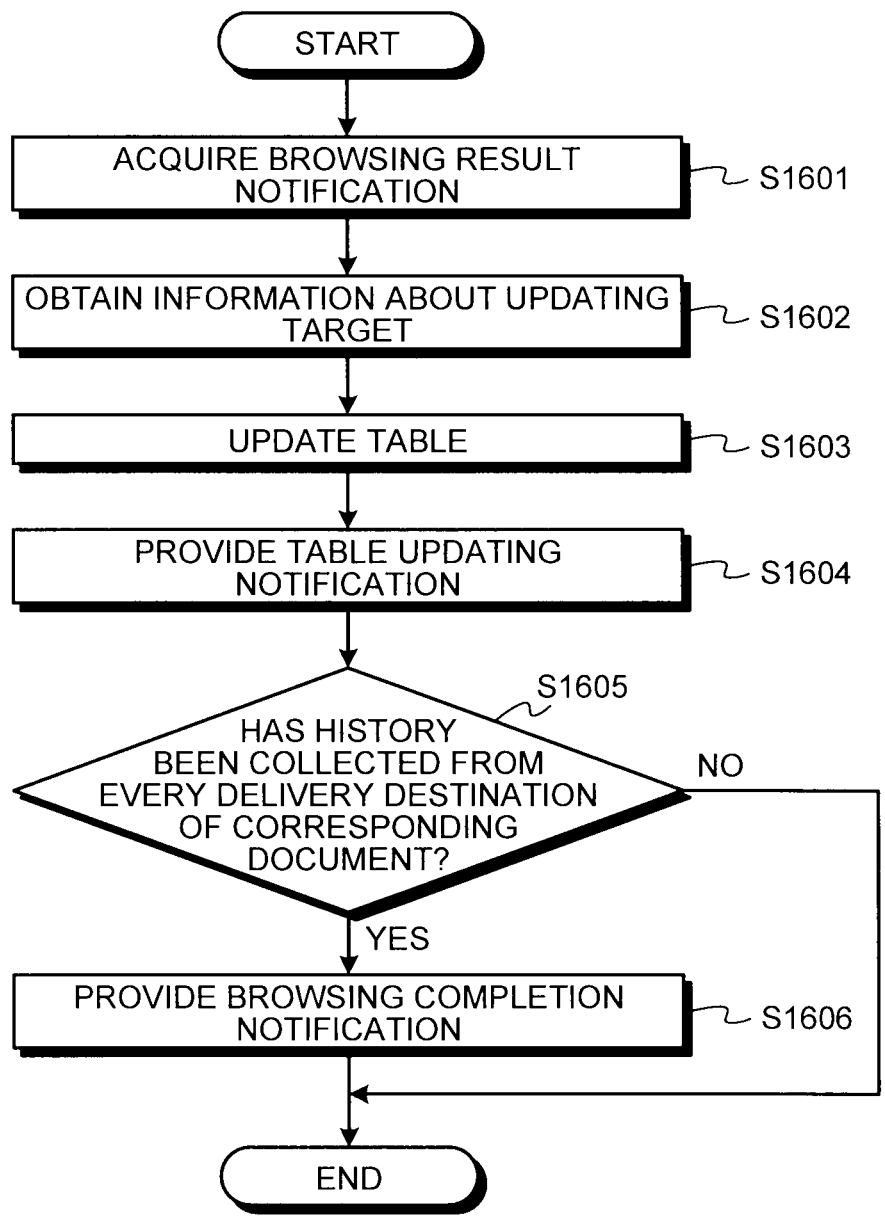
FIG. 16 is a flowchart illustrating a browsing-result collecting operation according to the first embodiment.

The browsing-history updating operation at S905 of FIG. 9 is described below. FIG. 16 is a flowchart illustrating the browsing-history updating operation for the unadapted client 2 and the adapted client 3. The operation illustrated in FIG. 16 is premised that notification of a browsing result is transmitted from the unadapted client 2 and the adapted client 3 to the document management apparatus 1.

Transmission of the browsing result from the unadapted client 2 and the adapted client 3 to the document management apparatus 1 can be performed such that, for instance, the document management apparatus 1 obtains the delivery destination address, to which the document has been delivered, based on the output destination information illustrated in FIG. 4 or the browsing history information illustrated in FIG. 5 and requests the delivery destination to provide a notification of the browsing result. In this configuration, the document management apparatus 1 may issue the request in response to operator's operation, or, alternatively, according to predetermined timing, e.g., after a lapse of a predetermined period of time or at a predetermined time.

A configuration where notification of a browsing result is provided not only when the document management apparatus 1 requests for the notification but also the unadapted client 2 and the adapted client 3 actively issue notification of a browsing result may be employed. In this configuration, the unadapted client 2 and the adapted client 3 may be configured to provide a notification of browsing result not only in response to a user operation but also according to predetermined timing as in the case of the document management apparatus 1.

Setting about the predetermined timing of the unadapted client 2 and that about the adapted client 3 are configured in the browsing-history collection application 206 and the browsing-history collection module 306, respectively. Settings such as those described above can be made by, for instance, as for the unadapted client 2, by causing the application program 504 to include setting information about the timing while delivery information such as that illustrated in FIGS. 12A and 12B is generated. As for the adapted client 3, such setting can be made by applying the setting to the browsing-history collection module 306 in advance or by transmitting setting information about the collection timing simultaneously when the document delivery process illustrated in FIG. 10 is performed.

Upon acquiring the browsing result notification from the unadapted client 2 or the adapted client 3 via the network (S1601), the browsing-history management unit 109 obtains information about a target, of which browsing history is to be updated, in the browsing history information illustrated in FIG. 5 based on an address of the device, the notification about which has been acquired (S1602). The browsing-history management unit 109 updates the browsing history information by updating "history collection status" of the to-be-updated target to "history collected," assigning a history ID to the acquired information about browsing history, and storing the assigned ID as "history ID" (S1603).

Upon completing processing at S1603, the browsing-history management unit 109 provides a notification that a browsing-history information table has been updated to an operator of the document management apparatus 1 (S1604). The notification at S1604 can be provided by using various methods, e.g., a display on the LCD 60 or transmission of an electronic mail to a preset email address.

Next, the browsing-history management unit 109 determines whether "history collected" is assigned to every address of the other "delivery destination addresses" associated with "document ID" of which "history collection status" has been updated (S1605). If, as a result of the determination, there is more than one "history uncollected" address (NO at S1605), the browsing-history management unit 109 exits the process. If "history collected" is assigned to all the addresses (YES at S1605), the browsing-history management unit 109 provides a notification that browsing of the document with the document ID is completed at all the delivery destinations to the operator of the document management apparatus 1 (S1606). As in the case of S1604, the notification can be provided by using various methods at S1606.

Figure 17:
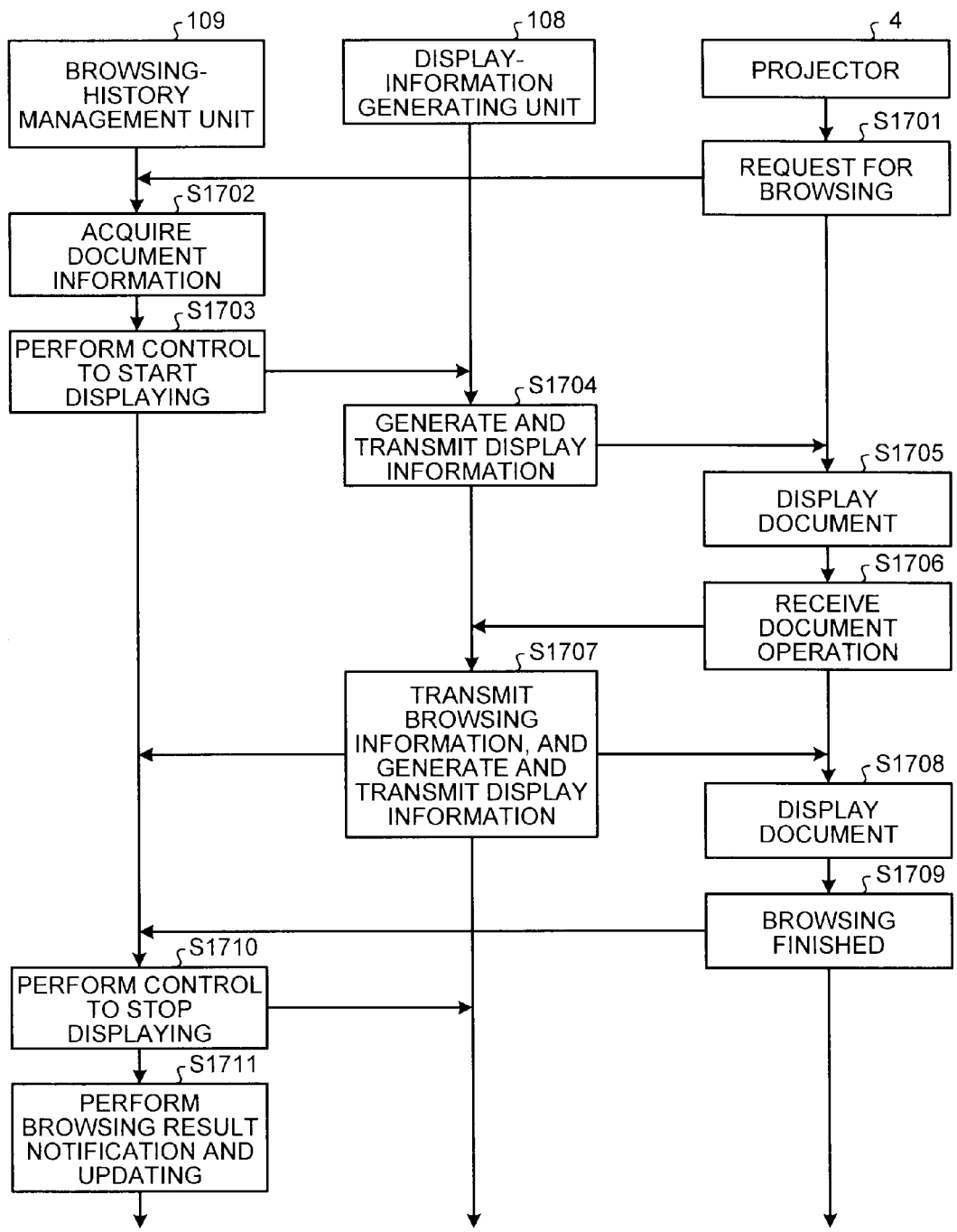
FIG. 17 is a sequence diagram illustrating operations in a situation where a document is browsed using the projector in the document management system according to the first embodiment.

FIG. 17 is a sequence diagram illustrating a document browsing operation and a browsing-history collecting operation in a situation where the delivery destination is a display device, such as the projector 4. In FIG. 17, processing performed by the network control unit 101 to carry out communications via the network is omitted. In a case where the delivery destination is the display device, such as the projector 4, document browsing and browsing history collection are executed as a sequence of operations.

In the case of the unadapted client 2 and the adapted client 3 described above, document delivery is performed by delivering information about a document, and the information about the document is stored in each of the devices. In contrast, in the case of the display device, such as the projector 4, to which the document is to be output as display information, such as HTML, the document management apparatus 1 outputs information, such as URL, for use in accessing the HTML information to the display device to deliver the document. This URL is information for accessing, for instance, the document management apparatus 1 operating as a Web server, thereby browsing a target document.

More specifically, the URL includes, in addition to information for identifying the document management apparatus 1 on the network, information for identifying a target document in the document management apparatus 1. Accordingly, if the device type of the delivery destination is a display device, such as the projector 4, the browsing-history-collection-style determining unit 110 of the document management apparatus 1 generates the URL based on the network address of the document management apparatus 1 and the information for identifying the to-be-delivered document at S1006.

When a user operates the projector 4 to browse the to-be-delivered document, the projector 4 accesses the browsing-history management unit 109 using the URL information according to the user operation (S1701). Upon receiving a browsing request from the projector 4, the browsing-history management unit 109 acquires document information from the document storing unit 107 according to the designated URL (S1702) and controls the display-information generating unit 108 to start displaying (S1703).

The display-information generating unit, 108 generates, according to control of the browsing-history management unit 109, display information in HTML format and transmits the display information to the projector 4 via the network control unit 101 (S1704). In the projector 4, the browser application 404 causes the projecting unit 420 to display the document via the display control unit 403 according to the display information in HTML format received via the network (S1705).

In the projector 4, when an operation, such as changing a page to be displayed or enlarging a part of the document, is performed by the user through the operating unit 70, the browser application 404 receives the document operation. Upon receiving the document operation, the browser application 404 transmits information relevant to the received operation to the display-information generating unit 108 via the network (S1706).

The display-information generating unit 108 acquires the information relevant to the document operation via the network control unit 401, generates new display information according to the information relevant to the operation, and transmits the new display information to the projector 4, while simultaneously causing the browsing-history management unit 109 to store the information relevant to the operation as information about browsing history (S1707). Put another way, at S1707, the display-information generating unit 108 functions as a delivery-information generating unit. Thus, the browsing-history management unit 109 collects information about browsing history in real time. Besides, the projector 4 renews document display according to the display information that is newly transmitted in response to the document operation (S1708).

Thereafter, when the user performs an operation to finish browsing on the projector 4, the browser application 404 notifies the browsing-history management unit 109 that browsing is finished (S1709). Upon recognizing that browsing is finished, the browsing-history management unit 109 controls the display-information generating unit 108 to stop displaying (S1710), performs an operation similar to that of FIG. 16 (S1711), and exits the process.

As described above, when a document is to be delivered to a display device, such as the projector 4, what is output from the document management apparatus 1 in response to operator's operation is a URL for use by the projector 4 to access the document. The projector 4 displays the document by accessing the document using the URL and simultaneously transmits a user operation performed while the projector 4 is displaying the document to the document management apparatus 1. Thus, the document management apparatus 1 collects results of document browsing using the projector 4 in real time.

A mode such as that described above makes it possible to collect browsing history even from the projector 4 that does not have, unlike the unadapted client 2 and the adapted client 3, a general-purpose information processing function in a manner similar to that from the unadapted client 2 and the adapted client 3.

As described above, in the document management system according to the first embodiment, the document management apparatus 1 determines a delivery pattern for a document depending on a type of a device, which is a delivery destination of the document, and then delivers the document. Therefore, keeping track of browsing activities performed on the delivered document can be achieved even in a situation where the document is browsed using a device that does not have the function of collecting document browsing history.

Second Embodiment

The document management apparatus 1 according to the first embodiment is configured to refer to the output destination information (see FIG. 4) where delivery destination addresses are associated with device types, thereby obtaining information about a method of collecting browsing history from a delivery destination, to which a document is to be delivered, based on a device type, and determine a delivery pattern based on the obtained information. However, in a case of a terminal (e.g., a tablet PC or a smart phone) of a type, with which a delivery destination address changes every time the terminal is connected to a document management apparatus, it is not possible to associate the delivery destination address with a device type in advance. To take a situation such as that described above into consideration, a document management apparatus according to a second embodiment is configured to first acquire a device type of a delivery destination device after communication between the document management apparatus and the delivery destination device is started, and then to determine a document delivery pattern.

A form of operation of a document management system and hardware configurations of devices according to the second embodiment are similar to those of the first embodiment; accordingly, repeated descriptions are omitted (see FIGS. 1 and 2).

Figure 18:
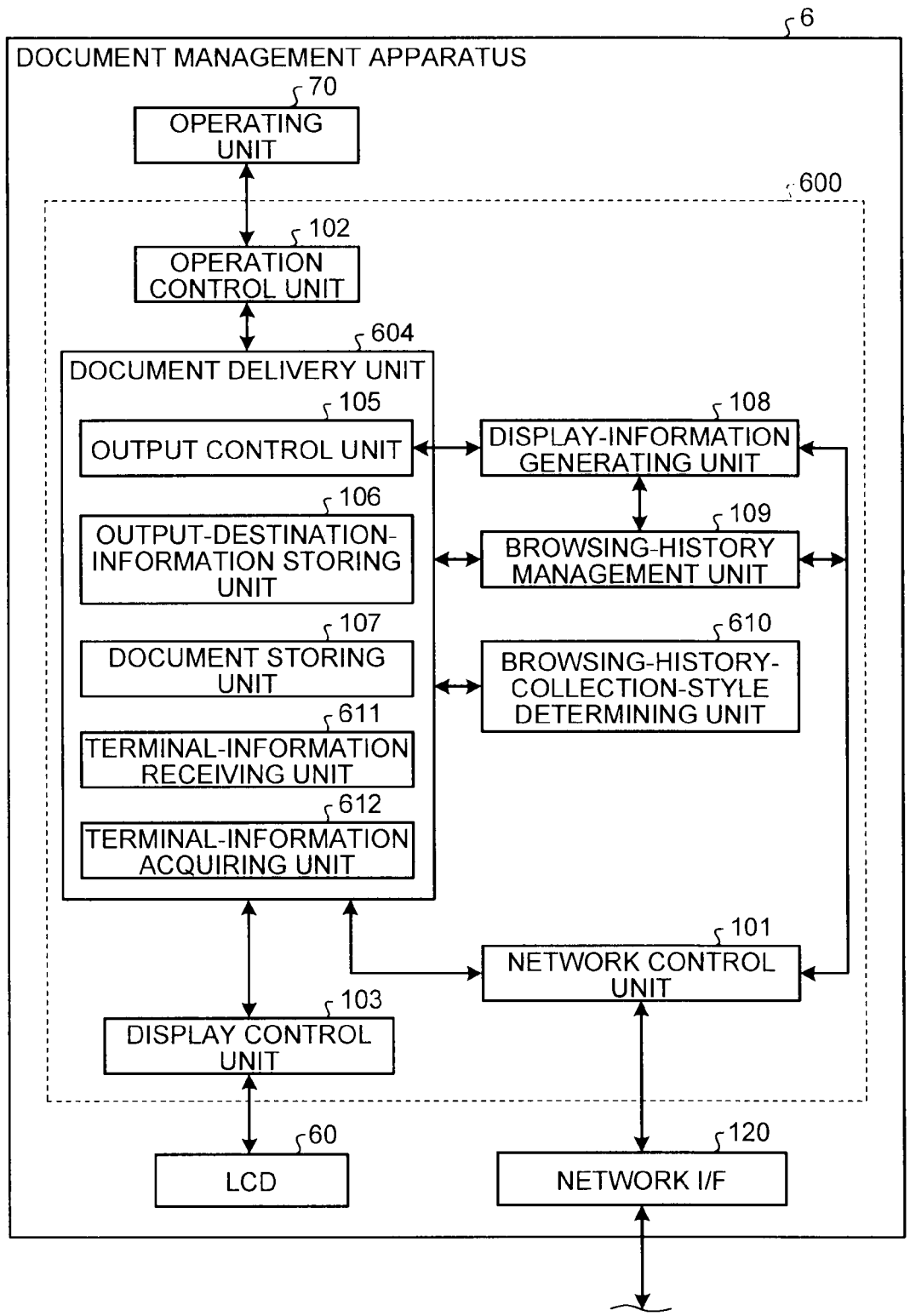
FIG. 18 is a block diagram illustrating a functional configuration of a document management apparatus according to a second embodiment.

A functional configuration of a document management apparatus 6 according to the second embodiment is described below with reference to FIG. 18. FIG. 18 is a block diagram illustrating the functional configuration of the document management apparatus 6 according to the second embodiment. As illustrated in FIG. 18, the document management apparatus 6 according to the second embodiment includes, in addition to the LCD 60 and the operating unit 70 described above with reference to FIG. 2, a controller 600 and the network I/F 120. The controller 600 includes the network control unit 101, the operation control unit 102, the display control unit 103, a document delivery unit 604, the display-information generating unit 108, the browsing-history management unit 109, and a browsing-history-collection-style determining unit 610. Furthermore, the document delivery unit 604 includes the output control unit 105, the output-destination-information storing unit 106, the document storing unit 107, a terminal-information receiving unit 611, and a terminal-information acquiring unit 612. The configurations and functions of these components other than the browsing-history-collection-style determining unit 610, the terminal-information receiving unit 611, and the terminal-information acquiring unit 612 are similar to those of the first embodiment, and repeated descriptions are omitted.

When a device type of a delivery destination device (an unadapted client 7, an adapted client 8, or a projector 9) is not associated in the output destination information (FIG. 4), the terminal-information receiving unit 611 requests the delivery destination device via the network control unit 101 to input device type information indicating the device type. Upon receiving the request, the device (delivery destination device) receives an input of the device type information from a user, and transmits the received device type information to the document management apparatus 6 (see FIGS. 19, 20, and 21, which will be described later). The terminal-information receiving unit 611 performs updating by receiving the device type information input by the user from the delivery destination device via the network control unit 101 and storing the device type information in the output destination information.

When the device type of the delivery destination device (the unadapted client 7, the adapted client 8, or the projector 9) is not associated in the output destination information (FIG. 4), the terminal-information acquiring unit 612 requests the delivery destination device via the network control unit 101 for the device type information. When the device (delivery destination device) that receives the request includes a terminal-information response unit, the device returns a response, which is the device type information about the device itself, to the document management apparatus 6 (see FIGS. 19, 20, and 21, which will be described later). The terminal-information acquiring unit 612 performs updating by acquiring the response, which is the device type information, from the delivery destination device via the network control unit 101 and storing the device type information in the output destination information.

The browsing-history-collection-style determining unit 610 obtains information (i.e., obtains information about a method of collecting browsing history from the delivery destination, to which the document is to be delivered) about the type of the delivery destination device from the device type information received by the terminal-information receiving unit 611 and also determines a delivery pattern for use in delivering the document based on the obtained information.

The browsing-history-collection-style determining unit 610 obtains information (i.e., obtains information about a method of collecting browsing history from the delivery destination, to which the document is to be delivered) about the type of the delivery destination device from the device type information acquired by the terminal-information acquiring unit 612 and also determines a delivery pattern for use in delivering the document based on the obtained information. When no response, or the device type information, is returned from the delivery destination device, the browsing-history-collection-style determining unit 610 determines that the device type of the delivery destination device is the projector 9 that includes no storing unit (an HDD or the like). The browsing-history-collection-style determining unit 610 controls generation of information to be ultimately delivered according to a result of the determination.

Figure 19:
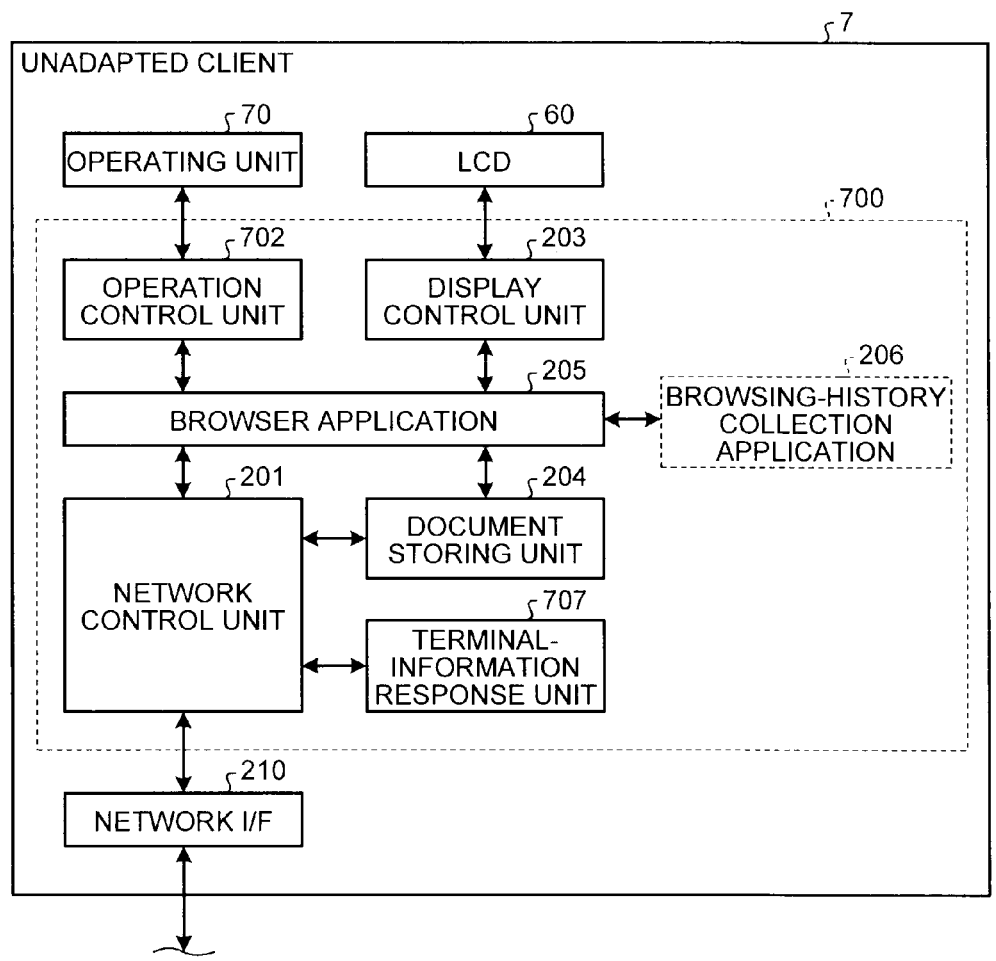
FIG. 19 is a diagram illustrating a functional configuration of an unadapted client according to the second embodiment.

FIG. 19 is a block diagram illustrating a functional configuration of the unadapted client 7 according to the second embodiment. As illustrated in FIG. 19, the unadapted client 7 according to the second embodiment includes, in addition to the LCD 60 and the operating unit 70 described above with reference to FIG. 2, a controller 700 and the network I/F 210. The controller 700 includes the network control unit 201, an operation control unit 702, the display control unit 203, the document storing unit 204, the browser application 205, the browsing-history collection application 206, and a terminal-information response unit 707. The configurations and functions of the components other than the operation control unit 702 and the terminal-information response unit 707 are similar to those of the first embodiment, and repeated descriptions are omitted.

Upon receiving a request for input of device type information from the document management apparatus 6 via the network control unit 201, the operation control unit 702 prompts a user to input the device type information and receives the device type information input by the user through the operating unit 70. The operation control unit 702 transmits the input device type information to the document management apparatus 6 via the network control unit 201.

Upon receiving a request for device type information from the document management apparatus 6 via the network control unit 201, the terminal-information response unit 707 returns a response, which is device type information about the device itself, to the document management apparatus 6 via the network control unit 201.

Figure 20:
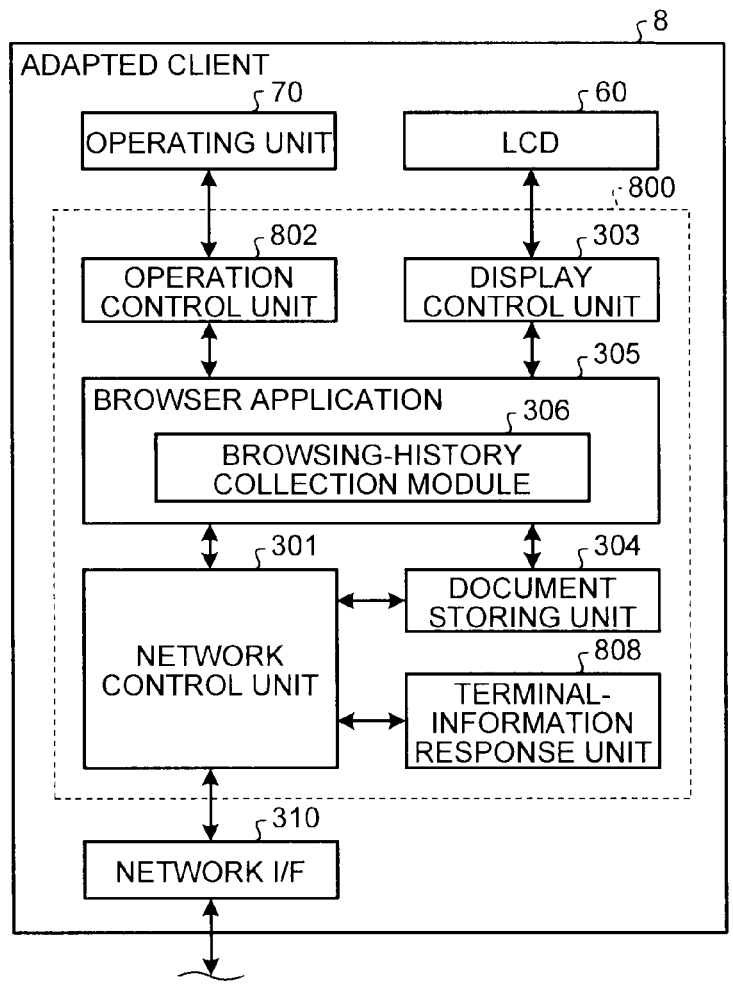
FIG. 20 is a diagram illustrating a functional configuration of an adapted client according to the second embodiment.

FIG. 20 is a block diagram illustrating a functional configuration of the adapted client 8 according to the second embodiment. As illustrated in FIG. 20, the adapted client 8 is substantially same in configuration as the unadapted client illustrated in FIG. 19 but differs in including the browsing-history collection module 306 as the internal module of the browser application 305 rather than including the browsing-history collection application 206. This makes it possible, in the adapted client 8, that the browsing-history collection module 306, which is the function incorporated in the browser application 305, can collect document browsing history without configuring the browsing-history collection application 206 each time when document browsing is performed. The adapted client 8 further includes an operation control unit 802 and a terminal-information response unit 807. Configurations and functions of these components are also similar to those of the unadapted client 7. Numerals 800, 803, 804, 808, and 310 respectively correspond to numerals 200, 203, 204, 208, and 210 in FIG. 6.

Figure 21:
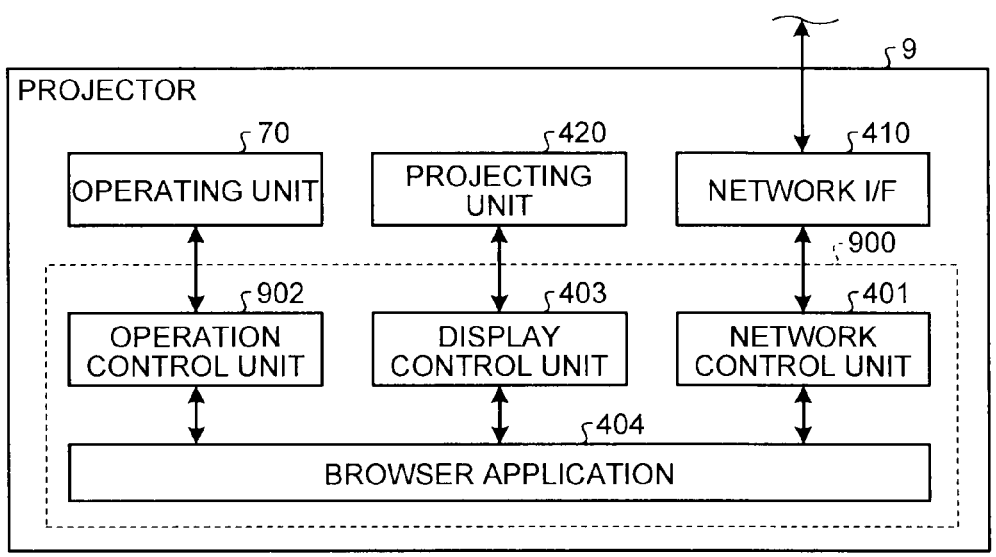
FIG. 21 is a block diagram illustrating a functional configuration of a projector according to the second embodiment.

FIG. 21 is a block diagram illustrating a functional configuration of the projector 9 according to the second embodiment. As illustrated in FIG. 21, the projector 9 according to the second embodiment includes, in addition to the operating unit 70 described above with reference to FIG. 2, a controller 900, the network I/F 410, and the projecting unit 420. The controller 900 includes the network control unit 401, an operation control unit 902, the display control unit 403, and the browser application 404. The configurations and functions of the components other than the operation control unit 902 are similar to those of the first embodiment, and repeated descriptions are omitted.

The operation control unit 902 acquires operating signals representing an operation performed by an operator through the operating unit 70 and inputs the signals to a module that operates in the controller 900 of the projector 4. Upon receiving a request for input of device type information from the document management apparatus 6 via the network control unit 401, the operation control unit 902 prompts a user to input the device type information and receives the device type information input by the user through the operating unit 70. The operation control unit 902 transmits the input device type information to the document management apparatus 6 via the network control unit 401.

Figure 22:
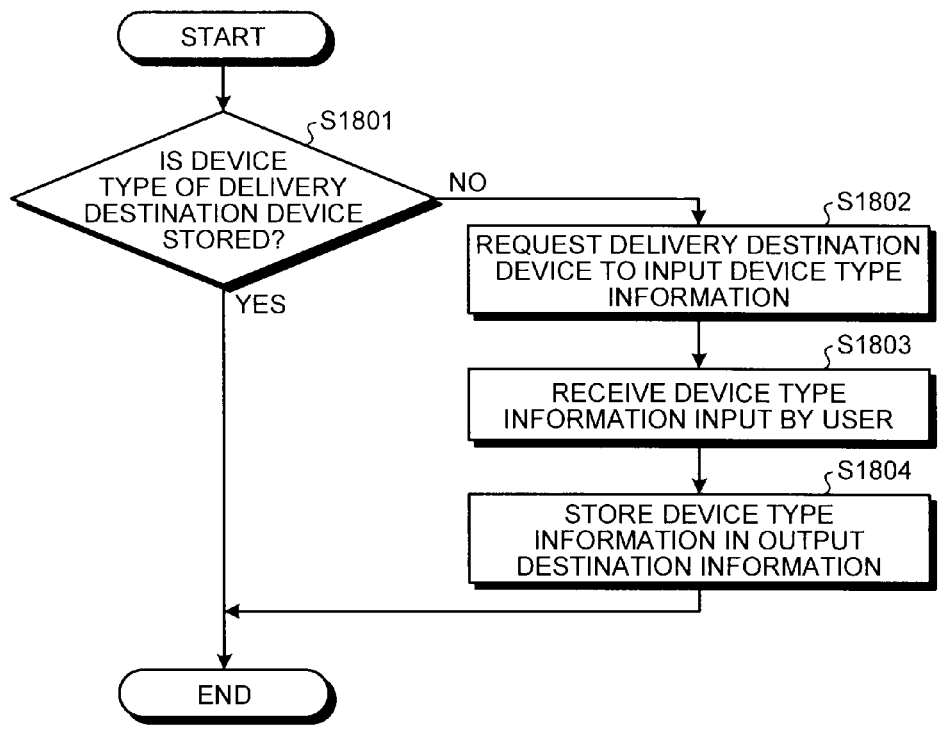
FIG. 22 is a flowchart illustrating a flow of control in a situation where the document management apparatus receives device type information from a delivery destination device.

Operations of the document management system according to the second embodiment are described below. FIG. 22 is a flowchart illustrating a flow of control in a situation where the document management apparatus 6 receives device type information from a delivery destination device.

First, the browsing-history-collection-style determining unit 610 determines whether a device type of the delivery destination device is stored in the output destination information (S1801). If the device type is stored (YES at S1801), the browsing-history-collection-style determining unit 610 exits the process.

If the device type is not stored (NO at S1801), the terminal-information receiving unit 611 requests the delivery destination device to input device type information via the network control unit 101 (S1802). The terminal-information receiving unit 611 receives the device type information input by the user from the delivery destination device via the network control unit 101 (S1803). Furthermore, the terminal-information receiving unit 611 stores the received device type information in the output destination information (S1804). After obtaining the process of FIG. 22, control proceeds to the process of FIG. 11 according to the first embodiment.

Figure 23:
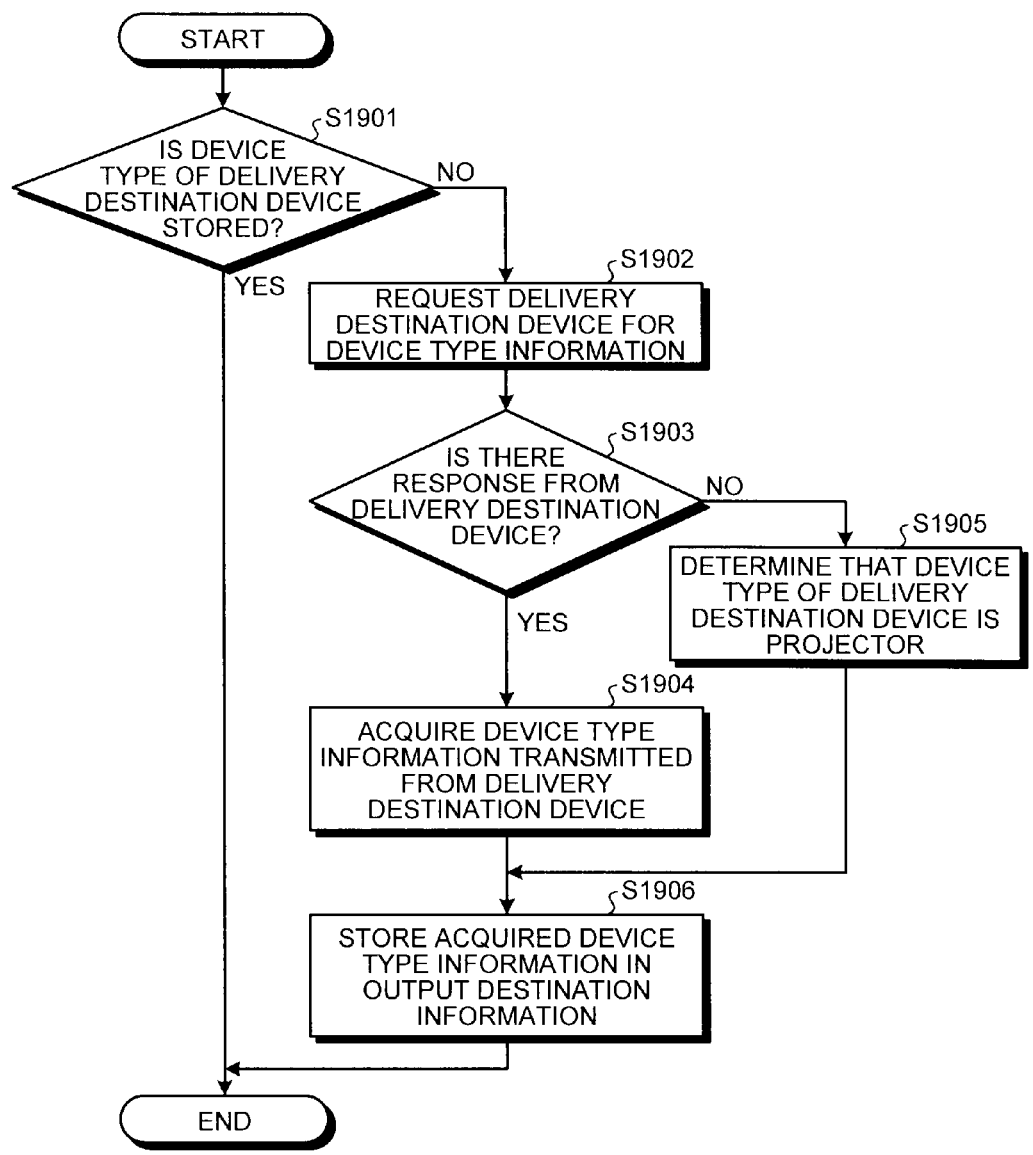
FIG. 23 is a flowchart illustrating a flow of control in a situation where the document management apparatus acquires device type information from a delivery destination device.

FIG. 23 is a flowchart illustrating a flow of control in a situation where the document management apparatus 6 acquires device type information from the delivery destination device.

First, the browsing-history-collection-style determining unit 610 determines whether a device type of the delivery destination device is stored in the output destination information (S1901). If the device type is stored (YES at S1901), the browsing-history-collection-style determining unit 610 exits the process.

If the device type is not stored (NO at S1901), the terminal-information acquiring unit 612 requests the delivery destination device for device type information via the network control unit 101 (S1902). The terminal-information acquiring unit 612 determines whether there is a response from the delivery destination device (S1903).

If there is a response from the delivery destination device (YES at S1903), the terminal-information acquiring unit 612 acquires the response, which is the device type information, from the delivery destination device via the network control unit 101 (S1904). If there is no response from the delivery destination device (NO at S1903), the browsing-history-collection-style determining unit 610 determines that the device type of the delivery destination device is the projector 9 (S1905).

The terminal-information acquiring unit 612 stores the device type information acquired at S1904 or the device type determined at S1905 in the output destination information (S1906). After finishing the process illustrated FIG. 23, control proceeds to the process of FIG. 11 according to the first embodiment.

Figure 24:
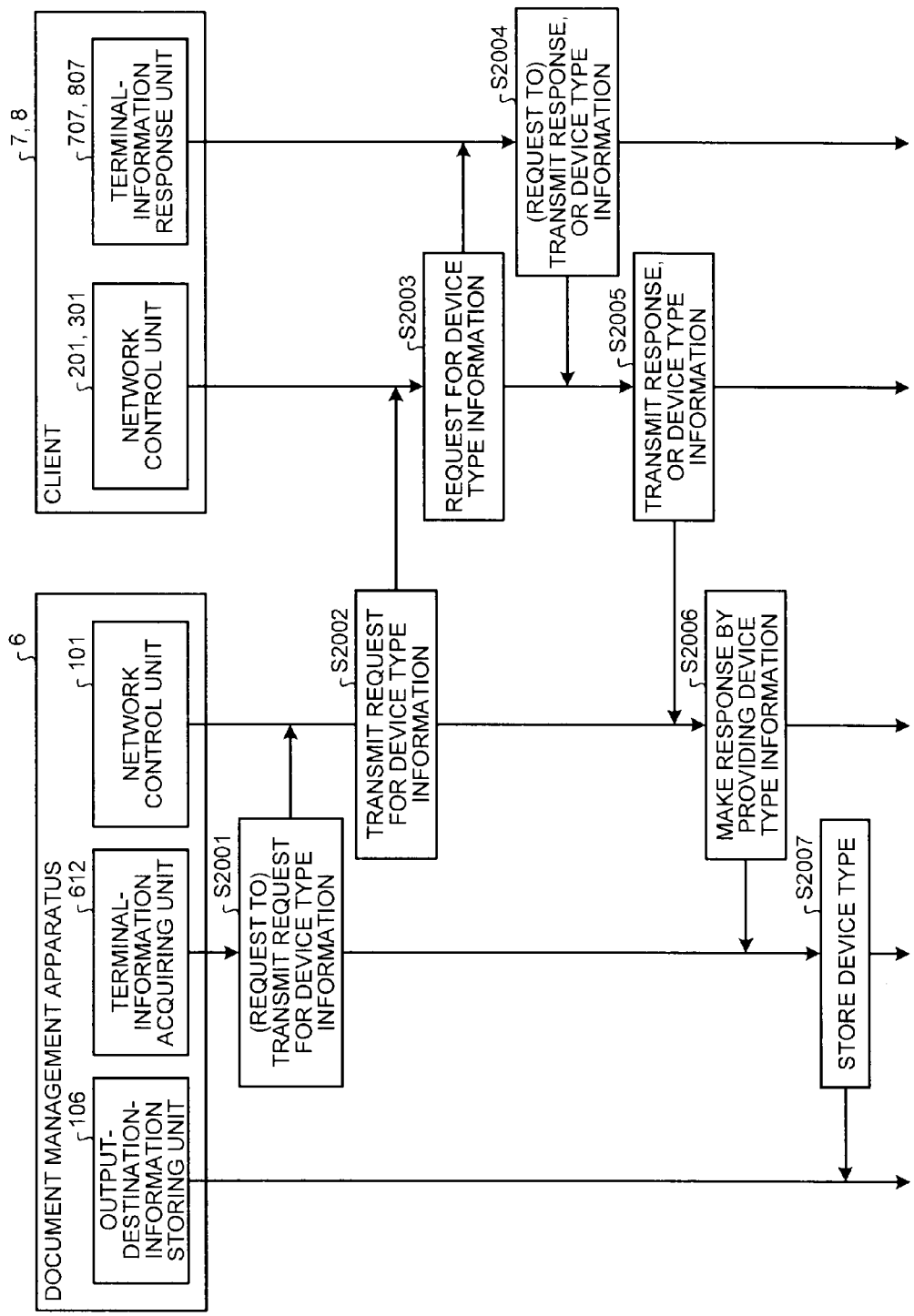
FIG. 24 is a sequence diagram illustrating a sequence of operations in the situation where the document management apparatus acquires the device type information from the delivery destination device.

A sequence of operations between the document management apparatus 6 and a delivery destination device (the unadapted client 7 or the adapted client 8) is described below. FIG. 24 is a sequence diagram illustrating the sequence of operations in a situation where the document management apparatus 6 acquires device type information from the delivery destination device.

The terminal-information acquiring unit 612 of the document management apparatus 6 requests the network control unit 101 to transmit a request for device type information (S2001). The network control unit 101 transmits the request for device type information to the network control unit 201, 301 of the client 7, 8 (the unadapted client 7 or the adapted client 8) (S2002).

Upon receiving the request for device type information, the network control unit 201, 301 of the client 7, 8 requests the terminal-information response unit 707, 807 for the device type information (S2003). Upon receiving the request for device type information, the terminal-information response unit 707, 807 requests the network control unit 201, 301 to transmit a response, or the device type information about the device itself (S2004). The network control unit 201, 301 transmits the response, which is the device type information, to the network control unit 101 of the document management apparatus 6 (S2005).

Upon receiving the response, which is the device type information, from the client 7, 8, the network control unit 101 returns a response, which is the device type information, to the terminal-information acquiring unit 612 (S2006). Upon receiving the response, the terminal-information acquiring unit 612 stores the device type in the output destination information in the output-destination-information storing unit 106

(S2007). Thus, the document management apparatus 6 can obtain information about the device type of the delivery destination device even when the device type of the delivery destination device type is not stored in advance.

As described above with reference to FIGS. 22 to 24, after storing the device type, the document management apparatus 6 determines a delivery pattern for a to-be-delivered document according to the device type of the delivery destination device and delivers the document to the delivery destination as in the first embodiment. The document management apparatus 6 then updates browsing history information according to a notification provided from the delivery destination device.

As described above, in the document management system according to the second embodiment, the document management apparatus 6 determines a delivery pattern for a document according to a type of a device, which is a delivery destination of the document, and thereafter delivers the document. Accordingly, keeping track of browsing activities performed on a delivered document can be achieved even in a situation where the document is browsed with a device that does not have the function of collecting document browsing history.

In the document management system according to the second embodiment, device type information that is input to the delivery destination device is received after communication with the delivery destination device is started; accordingly, it is not necessary to store the device type of the delivery destination device in advance. In the document management system according to the second embodiment, device type information is acquired from the delivery destination device after communication with the delivery destination device is started; accordingly, it is not necessary to store the device type of the delivery destination in advance.

According to an aspect of the embodiments, keeping track of browsing activities performed on a delivered document can be achieved even in a situation where the document is browsed using a device that does not have a function of collecting document browsing history.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A document management apparatus for delivering a document to a delivery destination via a network and collecting information about a browsing history of the document at the delivery destination, the document management apparatus comprising:
   circuitry configured to:
      obtain information about a type of a device, which is the delivery destination, and determine a delivery pattern for the document depending on the type of the device;
      generate, based on the document, information of the determined delivery pattern;
      deliver the document by transmitting the generated information of the delivery pattern to a network address of the delivery destination;
      determine the type of the device, which is the delivery destination, via the network based on the network address of the delivery destination;
      acquire information about the browsing history at the delivery destination to which the document has been delivered;
      store the information about the browsing history, wherein:
         when the type of the device is a type not adapted to collect information about a browsing history, the circuitry is configured to determine that a pattern for delivering a program for implementing collection of the information about the browsing history at the device together with the document as the delivery pattern, and
         when the pattern for delivering the program together with the document is determined as the delivery pattern, the circuitry is configured to generate, in addition to the program and the document, associating information that associates the document with the program such that the program is to be executed when the document is browsed;
      determine information about a version of the collected information about the browsing history provided to the device based on the network address of the delivery destination when the type of the device is a type adapted to collect information about a browsing history;
      determine the pattern for delivering the program for implementing collection of information about the browsing history at the device together with the document as the delivery pattern when the version is an earlier version than a latest version;
      store delivery destination information in which the network address of the delivery destination and the version of the collected information about the browsing history provided to the device, which is the delivery destination, are associated with each other; and
      determine the version of collected information about the browsing history provided to the device based on the stored delivery destination information.

2. The document management apparatus according to claim 1, wherein the circuitry is configured to:
   generate, based on the document, display information for displaying the document,
   determine a pattern for delivering display address information for accessing the display information as the delivery pattern when the type of the device is a type neither adapted to collect information about a browsing history nor adapted to execute the program,
   generate the display address information of the delivery pattern based on a network address of the document management apparatus and document identification information when the pattern for delivering the display address information is determined as the delivery pattern, the document identification information being used in identifying the document, and
   generate the display information based on an access to the display address information, and transmit the display information to an access source.

3. The document management apparatus according to claim 2, wherein,
   after generating the display information based on the access to the display address information and transmitting the display information to the access source, the circuitry is configured to:
      acquire information relevant to an operation onto the document displayed on the access source via the network,
      generate a new piece of the display information according to the acquired information relevant to the operation, and transmit the new display information to the access source, while simultaneously generating the information about the browsing history according to the information relevant to the operation and storing the information about the browsing history.

4. The document management apparatus according to claim 1, wherein the circuitry is configured to:
   obtain the information about the type of the device based on the network address of the delivery destination,
   acquire the information about the browsing history at the delivery destination, to which the document has been delivered, and
   store the information about the browsing history in association with the network address of the delivery destination.

5. The document management apparatus according to claim 1, wherein the circuitry is configured to:
   store another delivery destination information in which the network address of the delivery destination and the type of the device, which is the delivery destination, are associated with each other, and
   determine the type of the device based on the stored another delivery destination information.

6. The document management apparatus according to claim 1, wherein the circuitry is configured to:
   obtain the information about the version of the collected information about the browsing history provided to the delivery destination device via the network based on the network address of the delivery destination.

7. The document management apparatus according to claim 1, wherein the circuitry is configured to:
   request the device, which is the delivery destination, to receive an input of type information from a user, indicating the type of the device,
   receive the type information, which is input into the device, from the device via the network, and
   determine the type of the device based on the received type information.

8. The document management apparatus according to claim 1, wherein the circuitry is configured to:
   request the device, which is the delivery destination, for type information indicating the type of the device,
   acquire a response, which is the type information, from the device via the network, and
   determine the type of the device based on the acquired type information.

9. The document management apparatus according to claim 8, wherein circuitry is configured to:
   determine that the device is of a type having no memory when no response of the type information is returned.

10. The document management apparatus according to claim 1, wherein the circuitry is configured to:
    output information for notifying a user that the information about a browsing history has been acquired when the information about the browsing history has been acquired from the delivery destination.

11. The document management apparatus according to claim 10, wherein the circuitry is configured to:
    store document identification information that identifies the document delivered to delivery destinations, the document identification information being associated with network addresses of the delivery destinations, and output information for notifying the user that the information about a browsing history has been acquired when the information about the browsing history has been acquired from all of the network addresses of the delivery destinations associated with one piece of the document identification information.

12. A document management system comprising:
   a document management apparatus for delivering a document to a delivery destination via a network and collecting information about a browsing history of the document at the delivery destination, the document management apparatus including:
   circuitry configured to:
      obtain information about a type of a device, which is the delivery destination, and determine a delivery pattern for the document depending on the type of the device;
      generate based on the document, information of the determined delivery pattern;
      deliver the document by transmitting the generated information of the delivery pattern to a network address of the delivery destination;
      determine the type of the device, which is the delivery destination, via the network based on the network address of the delivery destination;
      acquire information about the browsing history at the delivery destination to which the document has been delivered;
      store the information about the browsing history, wherein:
         when the type of the device is a type not adapted to collect information about a browsing history, the circuitry is configured to determine that a pattern for delivering a program for implementing collection of the information about the browsing history at the device together with the document as the delivery pattern, and
         when the pattern for delivering the program together with the document is determined as the delivery pattern, the circuitry is configured to generate, in addition to the program and the document, associating information that associates the document with the program such that the program is to be executed when the document is browsed;
      determine information about a version of the collected information about the browsing history provided to the device based on the network address of the delivery destination when the type of the device is a type adapted to collect information about a browsing history;
      determine the pattern for delivering the program for implementing collection of information about the browsing history at the device together with the document as the delivery pattern when the version is an earlier version than a latest version;
      store delivery destination information in which the network address of the delivery destination and the version of the collected information about the browsing history provided to the device, which is the delivery destination, are associated with each other; and
      determine the version of collected information about the browsing history provided to the device based on the stored delivery destination information.

* * * * *